US012770432B2

(12) United States Patent
Zeng

(10) Patent No.: US 12,770,432 B2
(45) Date of Patent: Oct. 20, 2026

(54) AUTHENTICATION USING FACE BIOMETRICS WITHOUT ENROLLING FACE INFORMATION

(71) Applicant: University of South Carolina, Columbia, SC (US)

(72) Inventor: Qiang Zeng, Herndon, VA (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 310 days.

(21) Appl. No.: 18/623,120

(22) Filed: Apr. 1, 2024

(65) Prior Publication Data

US 2024/0331443 A1 Oct. 3, 2024

Related U.S. Application Data

(60) Provisional application No. 63/493,394, filed on Mar. 31, 2023.

(51) Int. Cl.

*G06V 40/16* (2022.01)
*G06F 21/44* (2013.01)
*G06V 20/17* (2022.01)
*G06V 20/40* (2022.01)
*G06V 40/60* (2022.01)

(52) U.S. Cl.

CPC ............ *G06V 40/172* (2022.01); *G06F 21/44* (2013.01); *G06V 20/17* (2022.01); *G06V 20/41* (2022.01); *G06V 40/168* (2022.01); *G06V 40/174* (2022.01); *G06V 40/67* (2022.01)

(58) Field of Classification Search

CPC .... G06V 40/172; G06V 20/17; G06V 40/174; G06V 40/168; G06V 40/67; G06V 20/41; G06F 21/44

USPC .......................................................... 382/118

See application file for complete search history.

(56) References Cited

U.S. PATENT DOCUMENTS 9,336,506 B2 5/2016 Shucker et al.
9,359,074 B2 6/2016 Ganesh et al.
9,459,620 B1 10/2016 Schaffalitzky
9,875,592 B1 1/2018 Erickson et al.
10,168,700 B2 * 1/2019 Gordon .................. B64U 10/13
10,592,843 B2 3/2020 Natarajan et al.
11,527,107 B1 * 12/2022 Mostafa ................ G06F 18/217
2009/0169062 A1 * 7/2009 Cheung .................. G06Q 30/02 382/115
2020/0026842 A1 * 1/2020 Jain ....................... G06F 21/316
2021/0173914 A1 * 6/2021 Keith, Jr. ................ G06F 21/31
2021/0279475 A1 * 9/2021 Tusch .................... G06V 20/53
2023/0129068 A1 * 4/2023 Madrigal ................ G01S 7/539 382/118
2023/0289431 A1 * 9/2023 Keith, Jr. ................ G06F 21/31
2023/0344830 A1 * 10/2023 Szigeti .................... G06F 21/88
2024/0086508 A1 * 3/2024 Upadhyay ............ G06V 40/172
2024/0212318 A1 * 6/2024 Bowden, Jr. ......... G06V 10/764
2024/0331443 A1 * 10/2024 Zeng ................... G06V 40/172

(Continued)

*Primary Examiner* — William D Titcomb

(74) *Attorney, Agent, or Firm* — Doug L. Lineberry; Maynard Nexsen PC

(57) ABSTRACT

Described herein are systems and methods for secure and usable authentication techniques for drone delivery that leverages biometric information of faces, unlike traditional biometrics-based approaches, it does not need users to enroll their biometric information and is impervious to common drone attacks.

17 Claims, 16 Drawing Sheets

Table 1: Comparison. Y: true, N: false, ?: unclear.

| Technique | P1 | P2 | P3 | P4 | P5 |
|---|---|---|---|---|---|
| Face/gait/speaker recognition | Y | N | N | N | Y |
| Google (scanning QR code) [72] | Y | Y | N | N | Y |
| Qualcomm (purchase code) [30] | Y | Y | N | N | Y |
| Walmart (beacon) [54] | N | Y | Y | N | Y |
| SoundUAV [57] | N | Y | N | N | Y |
| Distance bounding [8] | N | Y | Y | ? | N |
| SMILE2AUTH | Y | Y | Y | Y | Y |

(56) References Cited

U.S. PATENT DOCUMENTS

| | | | | |
|---|---|---|---|---|
| 2024/0411857 | A1* | 12/2024 | Keith, Jr. | H04L 9/50 |
| 2025/0191452 | A1* | 6/2025 | Sedouram | G06F 3/04886 |

* cited by examiner

Table 1: Comparison. Y: true, N: false, ?: unclear.

| Technique | P1 | P2 | P3 | P4 | P5 |
|---|---|---|---|---|---|
| Face/gait/speaker recognition | Y | N | N | N | Y |
| Google (scanning QR code) [72] | Y | Y | N | N | Y |
| Qualcomm (purchase code) [30] | Y | Y | N | N | Y |
| Walmart (beacon) [54] | N | Y | Y | N | Y |
| SoundUAV [57] | N | Y | N | N | Y |
| Distance bounding [8] | N | Y | Y | ? | N |
| SMILE2AUTH | Y | Y | Y | Y | Y |

FIG. 1

| **Encoding System** | **Accuracy** |
|---|---|
| **FaceNet** | 100% |
| Dlib | 99.2% |
| ArcFace | 99.4% |
| VGG-Face | 98.5% |
| DeepFace | 97.1% |
| DeepID | 96.3% |

FIG. 8

(a) Naive Mimicry Attack.

(b) Twin-based Mimicry Attack.

(a) Classifiers (b) EER of models vs. Video length (e) Weather (f) Facial disturbance (i) Distance (l) Accuracy vs Fps (m) Accuracy vs Illuminance level (c) Camera quality (d) Drones (g) Gender (h) Glasses (j) Video length (k) Number of participants for build ing the training dataset (n) Viewing angle histogram (o) Accuracy vs Viewing angle

AUTHENTICATION USING FACE BIOMETRICS WITHOUT ENROLLING FACE INFORMATION

TECHNICAL FIELD

The subject matter disclosed herein is generally directed to systems and methods for secure and usable authentication techniques for drone delivery that leverages biometric information of faces, unlike traditional biometrics-based approaches, it does not need users to enroll their biometric information and is impervious to common drone attacks.

BACKGROUND

Drone delivery, which makes use of unmanned aerial vehicles (UAVs) to deliver or pick up packages, is an emerging service. To ensure that a package is picked up by a legitimate drone and delivered to the correct user, mutual authentication between drones and users is critical. As delivery drones are expensive and may carry important packages, drones should keep a distance from users until the authentication succeeds. Thus, authentication approaches that require human-drone physical contact cannot be applied. Face recognition does not need human-drone contact. However, it has major limitations: (1) it needs users to enroll their face information, (2) it is vulnerable to attacks, such as 3D-printed masks and adversarial examples, and (3) it only supports a drone to authenticate a user (rather than mutual authentication).

Accordingly, it is an object of the present disclosure to provide a novel method for using face biometrics, without these limitations, and apply it to building an authentication system for drone delivery, named Smile2Auth. The evaluation shows that Smile2Auth is highly accurate, secure and usable.

Citation or identification of any document in this application is not an admission that such a document is available as prior art to the present disclosure.

SUMMARY

The above objectives are accomplished according to the present disclosure by providing in one instance, an authentication technique for drone-user interaction. The technique may include at least one drone, at least one user with at least one device, wherein the at least one drone and the at least one device take at least one drone video and at least one user video of the user, encoding at least one frame of the at least one drone video and at least one frame of the at least one user video to form at least one first embedding sequence and at least one second embedding sequence of at least one aspect of the user, comparing the at least one first embedding and the at least one second embedding to determine at least one distance value, wherein correlation of the at least one distance value derived from the at least one drone video and the at least one user video authenticate the at least one drone and at least one user with one another. Further, the at least one aspect of the user may be the user's face. Yet still, the user may be asked to vary the user's face by making a facial gesture. Further again, the authentication technique may be mutual as the at least one drone and the at least one user exchange the at least one first embedding and the at least one second embedding with one another and independently compare the at least one first embedding with the at least one second embedding. Still, the at least one user may not provide biometric data prior to interaction with the at least one drone. Further again, the at least one user and the at least one drone may capture video in real time. Yet still, multiple attempts at encoding at least one frame of the at least one drone video and at least one frame of the at least one user video to form at least one first embedding sequence and at least one second embedding sequence of at least one aspect of the user may be conducted until a maximum number of attempts is reached. Still again, accuracy for the technique may be defined as: Accuracy=(TP+TN)/(TP+TN+FP+FN), wherein: TP is the number of true positives, TN is the number of true negatives, FP is the number of false positives, and FN is the number of false negatives.

In another instance, the current disclosure provides an authentication method for device-user interaction. The method may include at least one device; at least one user with at least one smartphone; wherein the at least one device and the at least one smartphone take at least one device video and at least one user video of the user; encoding at least one frame of the at least one device video and at least one frame of the at least one user video to form at least one first embedding sequence and at least one second embedding sequence of at least one aspect of the user; comparing the at least one first embedding and the at least one second embedding to determine at least one distance value, wherein correlation of the at least one distance value derived from the at least one device video and the at least one user video authenticate the at least one device and at least one user with one another. Still further, the at least one aspect of the user may be the user's face. Moreover, the user may be directed to vary the at least one aspect of the user's face by making a facial gesture. Again, the authentication technique may be mutual as the at least one device and the at least one user exchange the at least one first embedding and the at least one second embedding with one another and independently compare the at least one first embedding with the at least one second embedding. Still further, the at least one user may not provide biometric data prior to interaction with the at least one device. Still again, the at least one user and the at least one device may capture video in real time. Moreover, multiple attempts at encoding at least one frame of the at least one device video and at least one frame of the at least one user video to form at least one first embedding sequence and at least one second embedding sequence of at least one aspect of the user may be conducted until a maximum number of attempts is reached. The authentication technique of claim 1, wherein accuracy is defined as: Accuracy=(TP+TN)/(TP+TN+FP+FN), wherein: TP is the number of true positives, TN is the number of true negatives, FP is the number of false positives, and FN is the number of false negatives. Furthermore, the at one device may comprise at least one robot, at least one vehicle, at least work station, or at least one piece of equipment.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 1 shows Table 1.

FIG. 8 shows Table 2.

Figure 2:
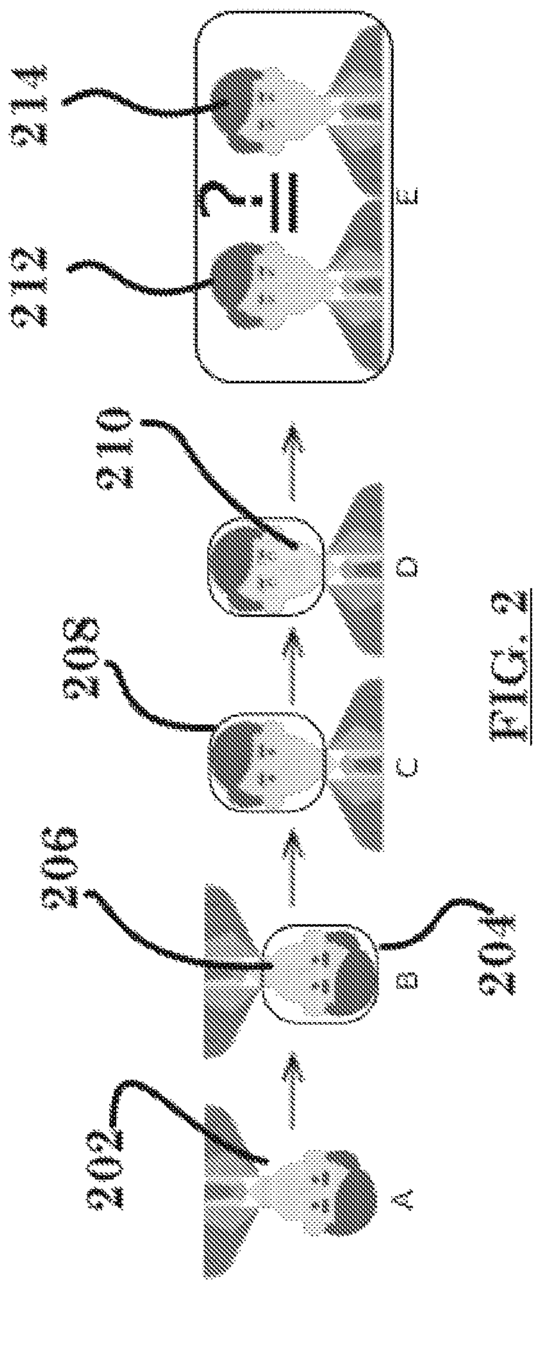
FIG. 2 shows an example of face recognition: Face recognition: (A) Photo, (B) Face Detection, (C) Alignment, (D) Encoding, (E) Verification.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +1-5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used herein, "tangible medium of expression" refers to a medium that is physically tangible or accessible and is not a mere abstract thought or an unrecorded spoken word. "Tangible medium of expression" includes, but is not limited to, words on a cellulosic or plastic material, or data stored in a suitable computer readable memory form. The data can be stored on a unit device, such as a flash memory or CD-ROM or on a server that can be accessed by a user via, e.g. a web interface.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Kits

Any of the systems and methods described herein can be presented as a combination kit. As used herein, the terms "combination kit" or "kit of parts" refers to the systems, methods, drones, and any additional components that are used to package, sell, market, deliver, and/or provide the systems and methods contained therein. Such additional components include, but are not limited to apps, drones, communication hardware and the like. When one or more of the systems or methods described herein or a combination thereof contained in the kit are provided simultaneously, the combination kit can contain the system and method components in a single embodiment or separate embodiment. When the systems and methods described herein or a combination thereof and/or kit components are not provided simultaneously, the combination kit can contain each component in combinations. The separate kit components can be contained in a single package or in separate packages within the kit.

In some embodiments, the combination kit also includes instructions printed on or otherwise contained in a tangible medium of expression. The instructions can provide information regarding the systems and methods, information regarding the methods or systems, indications for use, and/or recommended usage for the systems or methods contained therein. In some embodiments, the instructions can provide directions and protocols for providing the systems and methods described in greater detail elsewhere herein.

Drone delivery uses unmanned aerial vehicles (UAVs) to deliver packages. The drone-delivery market is projected to grow to $39 billion by the year 2030 and Markets and Markets. 2021. Drone Package Delivery Market by Solution (Platform, Infrastructure, Software, Service), Type (Fixed-Wing, Multirotor, Hybrid) Range (Short<25 km, Long>25 km), Package Size (<2Kg, 2-5 Kg, >5Kg), Duration, End Use, Region-Global Forecast to 2030. marketsandmarkets.com/Market-Reports/drone-package-delivery-market-10580366.html. Companies, such as UPS, see UPS. 2020. UPS Flight Forward is changing the world of drone delivery. ups.com/us/en/services/shipping-services/flight-forward-drones.page, Amazon, see Amazon. 2020. Amazon Prime Air. amazon.com/Amazon-Prime-Air/b?ie=UTF8&node=8037720011, and Walmart, see Walmart. 2020. Walmart Now Piloting On-Demand Drone Delivery with Flytrex. corporate.walmart.com/newsroom/2020/09/09/walmart-nowpiloting-on-demand-drone-delivery-with-flytrex, are actively deploying the service. For example, Amazon's Prime Air is designed "to safely get packages to customers in 30 minutes or less using autonomous aerial vehicles" See Amazon Prime Air, supra.

The imminent popularity makes drone delivery an attractive attack target. Like the human-based delivery service, drone delivery provides two kinds of services, namely package pickup and package delivery; both are vulnerable to impersonation attacks. In a package delivery service, an attacker impersonates a legitimate user to take the package; thus, the drone should authenticate the user. In package pickup, an attacker controls a malicious drone impersonating a legitimate drone to steal the user's package; thus, the user should authenticate the delivery drone. In short, mutual user-drone authentication is critical for the emerging service.

Delivery drones are expensive and may carry important packages. Thus, a drone should keep a safe distance from persons until a successful authentication. This constraint makes authentication methods that require human-drone physical contact, such as keypads and fingerprints, inapplicable.

Importantly, while drone delivery is one focus of the current disclosure, the current disclosure is not so limited. The current disclosure may apply to all facets of drone/user interaction. This disclosure also comprises mutual authentication as the techniques herein authenticate both the drone and the user. Indeed, the techniques herein can be applied to a plethora of devices in addition to drones such as robots, automobiles, work stations—such as a computer terminal, laptop, or remote work setup, equipment—such as a 3-D printer, laser drill, die press, etc., as long as the device has a camera or other suitable optic device to aid in authentication.

In addition to avoiding human-drone physical contact, we find the following properties highly desirable. (P1) no need of special user-side hardware; (P2) no need of biometric enrollment; (P3) mutual user-drone authentication; (P4) resilient to attacks; and (P5) no compatibility issues between drones and user devices. As summarized in Table 1, see FIG. 1, face, gait, or speaker recognition can be used for authentication without involving drone-human contact. However, these methods need to enroll the user's biometric information (P2: N), and cannot authenticate drones (P3: N). In addition, there are many known attacks to face, see Yinpeng Dong, Hang Su, Baoyuan Wu, Zhifeng Li, Wei Liu, Tong Zhang, and Jun Zhu. 2019. Effcient decision-based black-box adversarial attacks on face recognition. In Proceedings of the IEEE Conference on Computer Vision and Pattern Recognition. 7714-7722 and Mahmood Sharif, Sruti Bhagavatula, Lujo Bauer, and Michael K Reiter. 2016. Accessorize to a crime: Real and stealthy attacks on state-of-the-art face recognition. In Proceedings of the 2016 acm sigsac conference on computer and communications security (CCS). 1528-1540, gait, see Davrondzhon Gafurov. 2007. A survey of biometric gait recognition: Approaches, security and challenges. In Annual Norwegian computer science conference. Annual Norwegian Computer Science Conference Norway, 19-21 and Davrondzhon Gafurov, Einar Snekkenes, and Patrick Bours. 2007. Spoof attacks on gait authentication system. IEEE Transactions on Information Forensics and Security 2, 3 (2007), 491-502, or speaker recognition, see Felix Kreuk, Yossi Adi, Moustapha Cisse, and Joseph Keshet. 2018. Fooling end-to-end speaker verification with adversarial examples. In 2018 IEEE International Conference on Acoustics, Speech and Signal Processing (ICASSP). IEEE, 1962-1966, Felix Kreuk, Yossi Adi, Moustapha Cisse, and Joseph Keshet. 2018. Fooling end-to-end speaker verification with adversarial examples. In 2018 IEEE International Conference on Acoustics, Speech and Signal Processing (ICASSP). IEEE, 1962-1966, and Yi Xie, Cong Shi, Zhuohang Li, Jian Liu, Yingying Chen, and Bo Yuan. 2020. Real-time, universal, and robust adversarial attacks against speaker recognition systems. In IEEE International Conference on Acoustics, Speech and Signal Processing (ICASSP). 1738-1742 (P4: N).

A Google patent, see Brian Daniel Shucker and Brandon Kyle Trew. 2016. Machine-readable delivery platform for automated package delivery. U.S. Pat. No. 9,336,506, has the delivery drone authenticate a user by scanning a QR code shown on the user's smartphone. However, it is vulnerable to vision relay attacks (P4: N), where a malicious drone scans the QR code shown on the user's smartphone and relays it to the attacker's smartphone. Qualcomm, see Shriram Ganesh and Jose Roberto Menendez. 2016. Methods, systems and devices for delivery drone security. U.S. Pat. No. 9,359,074, proposes an authentication method by having the user's smartphone send a one-time purchase code or digital token to the drone. But this protocol is vulnerable to radio relay attacks (P4: N). Neither of the two patents considers authenticating the drone (P3: N). Walmart, Chandrashekar Natarajan, Donald R High, and V John J O'Brien. 2020. Unmanned aerial delivery to secure location. U.S. Pat. No. 10,592,843 proposes a mutual authentication method by leveraging a user-side locker that uses Bluetooth beacon signals to communicate with the drone. However, it needs user-side infrastructure (P1: N) and is also vulnerable to radio relay attacks (P4: N). SoundUAV, see Soundarya Ramesh, Thomas Pathier, and Jun Han. 2019. SoundUAV: Towards Delivery Drone Authentication via Acoustic Noise Fingerprinting. In Proceedings of the 5th Workshop on Micro Aerial Vehicle Networks, Systems, and Applications. 27-32, proposes a method to authenticate a drone by fingerprinting its motor noises caused by manufacturing imperfections. As the propellers of a hovering drone generate varying noises (e.g., due to the wind and different package weights) and thus would affect accuracy, SoundUAV has a drone land inside a dock; the lock then collects the motor noises and compares them with the fingerprint, making the drone be easily captured by an attacker. It needs a user-side docking station (P1: N), does not authenticate the user (P3: N), and is vulnerable to audio replay attacks (P4: N).

Distance bounding, see Stefan Brands and David Chaum. 1993. Distance-bounding protocols. In Workshop on the Theory and Application of Cryptographic Techniques. Springer, 344-359, enables one device to establish an upper bound on its distance to another device, which can be used to verify proximity. However, it requires special hardware, see Kasper Bonne Rasmussen and Srdjan Capkun. 2010. Realization of RF Distance Bounding. In USENIX Security Symposium. 389-402, that is not widely available (P1: N). The security of distance bounding protocols is being actively studied, see Gildas Avoine, Muhammed Ali Bing61, Ioana Boureanu, Srdjan Capkun, Gerhard Hancke, Suleyman Karda, Chong Hee Kim, Cedric Lauradoux, Benjamin Martin, Jorge Munilla, et al. 2018. Security of distance-bounding: A survey. ACM Computing Surveys (CSUR) 51, 5 (2018), 1-33. See, Cas Cremers, Kasper B Rasmussen, Benedikt Schmidt, and Srdjan Capkun. 2012. Distance hijacking attacks on distance bounding protocols. In IEEE Symposium on Security and Privacy (S&P). IEEE, 113-127 and Sjouke Mauw, Zach Smith, Jorge Toro-Pozo, and Rolando Trujillo-Rasua. 2018. Distance-bounding protocols: Verification without time and location. In 2018 IEEE Symposium on Security and Privacy (S&P). IEEE, 549-566 (P3: ?). As an interoperable ecosystem for distance bounding is not yet available, see FiRa Consortium, Inc. 2021. Why Does UWB Need a Consortium?firaconsortium.org/about/consortium, compatibility and interoperability issues (P5: N) between delivery drones and users' devices cannot be ignored.

The current disclosure provides an authentication system for drone delivery, named Smile2Auth, which meets all the properties. When the delivery drone hovers keeping a safe distance from the user, the drone and the user's phone (or other suitable device) both take a short video of the user, who smiles (or makes other facial expressions). Smile2Auth is built on a novel way of using face biometrics. Specifically, each frame in the two videos is encoded into an embedding of the face, which is a high-dimensional vector. This way, the two videos are converted to two sequences of embeddings. At each point in time, a pair of embeddings from the two sequences is compared to generate a distance value. The series of distance values is used to derive features to train a model for mutual authentication. If the drone and the user's phone have recorded the same smile, the distance values should be consistently low; otherwise, not. Our study of face embeddings and evaluation both validate the hypothesis.

This novel use of face biometrics has extraordinary resilience to attacks (such as 3D-printed masks, adversarial examples, and even an identical twin that attacks the other), and we propose it based on the following insights. First, traditional face recognition based authentication loses information significantly in two aspects. 1) It omits the realtimeness information completely. Essentially, it compares the current face information captured during the authentication with a biometric template captured in the past. It ignores the information regarding when an emotion starts and how long it lasts. 2) It ignores the uniqueness during each authentication. One may smile slightly this time and laugh next time. Consequently, regardless of the victim's facial expressions, as long as an attacker impersonates the template well (e.g., using a 3D-printed mask), the approach can be fooled.

Smile2Auth captures the realtimeness information. Each face embedding is annotated with a timestamp. A strong attacker (such as an identical twin) who impersonates the user will likely fail, as the average human reaction time is larger than 200 ms, see T. P. Ghuntla, H. B. Mehta, P. A. Gokhale, and C. J. Shah. 2012. A Comparative Study of Visual Reaction Time in Basketball Players and Healthy Controls. National Journal of Integrated Research in Medicine 3, 1 (2012), Aditya Jain, Ramta Bansal, Avnish Kumar, and K. D. Singh. 2015. A comparative study of visual and auditory reaction times on the basis of gender and physical activity levels of medical first year students. International Journal of Applied & Basic Medical Research 5, 2 (2015) and Daniel V. McGehee, Elizabeth N. Mazzae, and G.H. Scott Baldwin. 2000. Driver Reaction Time in Crash Avoidance Research: Validation of a Driving Simulator Study on a Test Track. HFES Annual Meeting 44, 20 (2000), and such a time difference is detected as attacks by our system. Plus, humans are imperfect and thus cannot mimic consistently well at each point in time; the resulting high variance of distance values also indicates attacks. Moreover, Smile2Auth makes use of uniqueness of each motion, as any unique details are observed by both sides (drone and smartphone) and used in comparison. An attacker who ignores the unique details will fail.

Moreover, traditional face recognition based authentication needs users to enroll their face information first, which harms privacy and usability. Plus, it may fail when a user wears sunglasses or heavy makeup, see Antitza Dantcheva, Cunjian Chen, and Arun Ross. 2012. Can facial cosmetics affect the matching accuracy of face recognition systems?. In 2012 IEEE Fifth international conference on biometrics: theory, applications and systems (BTAS).IEEE, 391-398 and Christian Rathgeb, Antitza Dantcheva, and Christoph Busch. 2019. Impact and Detection of Facial Beautification in Face Recognition: An Overview. IEEE Access 7 (2019), 152667-152678. doi.org/10.1109/ACCESS.2019.2948526. Finally, it only supports the drone to authenticate the user, rather than mutual authentication. In contrast, with Smile2Auth, a user's smartphone captures the ground truth information about the user's face. To make the authentication decision, the drone's video is compared against the ground truth. Thus, Smile2Auth (1) does not need the user to enroll her face biometrics, (2) works well with sunglasses and heavy makeup, and (3) supports mutual authentication (as the two sides exchange the embedding values to conduct the comparison independently).

The current disclosure built a prototype of Smile2Auth and perform a thorough evaluation. The results show that Smile2Auth attains a very high accuracy, which keeps 100% when the face-drone distance is up to four meters, different drones and smartphones are examined, frames per second (fps) is as low as 4, and the weather varies. It also works well at night when the drone is equipped with cheap LED lights. See, Amazon. 2022. STARTRC Mavic Air 2s Night Lights with Extension Holder. amazon.com. We make the following contributions.

- We propose a novel way of using face biometrics, which does not need to enroll the user's biometric information. It has extraordinary resilience to attacks, as it captures the realtimeness and uniqueness of a face making an emotion.
- We apply it to designing a highly usable drone-delivery authentication system Smile2Auth. It provides mutual authentication between a drone and a user, and does not depend on any special user-side hardware, such as a lockbox or ultra-wideband (UWB) device for distance bounding.
- We built a prototype of Smile2Auth and evaluated it. The evaluation considers a strong adversary, such as a twin, and examines different phones, drones, face-drone distances, weather, frame rates, illuminance levels. The results show that Smile2Auth is highly accurate, resilient to attacks, and robust under different environments.

Face Recognition

While this work is different from the traditional face-recognition system, it leverages many advances on this topic. We thus describe face recognition briefly. A typical face-recognition system consists of two phases: enrollment, which requires users to enroll their face information, and verification, which, given a claimed identity, compares the captured face information against the enrolled template associated with the claimed identity in the following steps.

Face Detection. A face detector determines where face 202 is by mapping out structural landmarks of the face. As shown in FIG. 2 at (B), the detector then places a bounding box 204 around face 204 and crops it from the photo to form cropped face 206.

Alignment. Cropped face 206 is rotated so that it is aligned consistently. For example, in FIG. 2 at (C), as cropped face 206 is upside down, it is rotated 180 degrees, see 208.

Encoding. As shown in FIG. 2 at (D), a neural network then extracts face features 210 and represents them as a high dimensional vector, called embedding, such that the distance between the embeddings of the same face is small.

Verification. As shown in FIG. 2 at (E), encoding 212 is then compared against the encoding of the enrolled face 214 biometrics by calculating a distance to verify the claimed identity.

We clarify that we do not propose any new face detection and encoding techniques. Instead, we use them in a novel way and apply the idea to authentication.

Relay Attacks

Much research, see Boris Danev, Heinrich Luecken, Srdjan Capkun, and Karim El Defrawy. 2010. Attacks on physical-layer identification. In Proceedings of the third ACM conference on Wireless network security. 89-98, and Aanjhan Ranganathan and Srdjan Capkun. 2017. Are we really close? Verifying proximity in wireless systems. IEEE Security & Privacy (2017), has demonstrated the insecurity of using certain radio characteristics, such as Received Signal Strength Indicator (RSSI), BLE beacons, and radio fingerprinting, for verifying proximity. For instance, with reduced-range Bluetooth, even if the communication channel is encrypted, attackers are able to launch radio relay attacks (aka Mafia Fraud Attacks, see Yvo Desmedt, Claude Goutier, and Samy Bengio. 1987. Special uses and abuses of the Fiat-Shamir passport protocol. In Conference on the Theory and Application of Cryptographic Techniques. Springer, 21-39, without breaking the underlying cryptography. As a concrete example, to compromise Passive Keyless Entry and Start (PKES) systems used in modern cars, see Aurélien Francillon, Boris Danev, and Srdjan Capkun. 2011. Relay attacks on passive keyless entry and start systems in modern cars. In Proceedings of the Network and Distributed System Security Symposium (NDSS). Eidgenössische Technische Hochschule Zürich, Department of Computer Science, a car thief relays the radio signals between the key and the car to open and start the car. Radio relay attacks can be made very fast; e.g., 120 ns, see Francillon et al. 2011. Thus, it is diffcult to detect relay attacks by detecting the incurred delay, see Francillon et al. 2011. Car thefts applying relay attacks have been reported, see TripWire. 2017. Relay Attack against Keyless Vehicle Entry Systems Caught on Film. tripwire.com/state-of-security/security-awareness/relayattack-keyless-vehicle-entry-systems-caught-film/and are cheap ($22) and Wired. 2017. Just a Pair of These $11 Radio Gadgets Can Steal a Car. wired.com/2017/04/just-pair-11-radio-gadgets-can-steal-car/. Readers are referred to, see Boris Danev, Heinrich Luecken, Srdjan Capkun, and Karim El Defrawy. 2010. Attacks on physical-layer identification. In Proceedings of the third ACM conference on Wireless network security. 89-98 and Aanjhan Ranganathan and Srdjan Capkun. 2017. Are we really close? Verifying proximity in wireless systems. IEEE Security & Privacy (2017), about the insecurity of naive methods for verifying proximity, such as RSSI, radio fingerprinting, etc.

Figure 3:
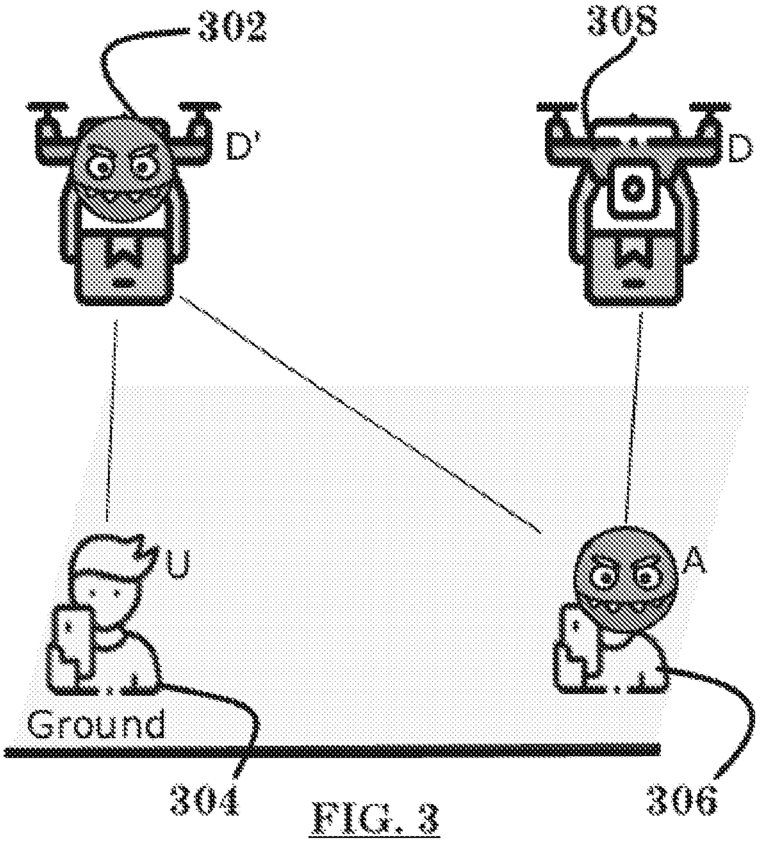
FIG. 3 shows examples of a relay attack, a legitimate user, and a malicious drone attacker.

Like attacks against cars, see Francillon et al. 2011, radio relay attacks against drone delivery are also easy to launch, see Chuxiong Wu, Xiaopeng Li, Lannan Luo, and Qiang Zeng. 2022. G2Auth: secure mutual authentication for drone delivery without special user-side hardware. In Proceedings of the 20th Annual International Conference on Mobile Systems, Applications and Services (MobiSys). 84-98. As shown in FIG. 3, the malicious drone D' 302 hovers in front of U 304, who incorrectly considers D' as the delivery drone and starts the authentication procedure (e.g., sending the purchase code, see Shriram Ganesh and Jose Roberto Menendez. 2016. Methods, systems and devices for delivery drone security. U.S. Pat. No. 9,359,074, or showing the QR code, see Brian Daniel Shucker and Brandon Kyle Trew. 2016. Machine-readable delivery platform for automated package delivery. U.S. Pat. No. 9,336,506). Then, D' relays the radio, without knowing the encryption key, to the attacker A's phone, which further relays the radio to the delivery drone D 308 hovering near A.

When a one-time QR code is used, see Shucker et al. 2016, D' scans the QR code and sends it, over radio, to the phone of A, which shows it to D; called a vision relay attack, see Chuxiong Wu, Xiaopeng Li, Lannan Luo, and Qiang Zeng. 2022. G2Auth: secure mutual authentication for drone delivery without special user-side hardware. In Proceedings of the 20th Annual International Conference on Mobile Systems, Applications and Services (MobiSys). 84-98. It is worth noting that when peer-to-peer Bluetooth communication is used, but D and U are actually far apart, an attacker needs to launch a radio relay attack to bridge the Bluetooth communication between D and U and initiate the authentication process, and then a vision relay attack is used to relay the QR code. On the other hand, if a backend server is used for the communication between D and U, a radio relay attack is unnecessary since the communication is bridged through the server even when D and U are far away from each other.

To mount relay attacks against drone delivery, an attacker has at least the following ways. (1) Given a popular place, such as a square or plaza, it is not uncommon that multiple persons wait for packages. A nearby attacker thus can exploit the inaccuracy of GPS, see GPS.gov. 2015. GPS Accuracy. gps.gov/systems/gps/performance/accuracy/to launch attacks, a concrete example is shown infra. (2) As civilian GPS signals are not encrypted, an attacker can use GPS spoofing to mislead a delivery drone. GPS spoofing has been demonstrated on drones, see Andrew J Kerns, Daniel P Shepard, Jahshan A Bhatti, and Todd E Humphreys. 2014. Unmanned aircraft capture and control via GPS spoofing. Journal of Field Robotics 31, 4 (2014), 617-636, and Daniel P Shepard, Jahshan A Bhatti, Todd E Humphreys, and Aaron A Fansler. 2012. Evaluation of smart grid and civilian UAV vulnerability to GPS spoofing attacks. In Radionavigation Laboratory Conference Proceedings, and GPS spoofers can be made from inexpensive commercial off-the-shelf components. As delivery drones of a courier company usually have certain models, markings, and path patterns, it is not difficult for an attacker to identify victim delivery drones. If a victim user has a routine for using drone delivery or when a drone gets close to the destination and about to land, it is also easy for an attacker to identify the victim user. (3) If a university or company campus uses Bluetooth beacons for accurate navigation, an attacker can clone or manipulate the signals to mislead drones, see Kang Eun Jeon, James She, Perm Soonsawad, and Pai Chet Ng. 2018. Ble beacons for internet of things applications: Survey, challenges, and opportunities. IEEE Internet of Things Journal 5, 2 (2018), see Constantinos Kolias, Lucas Copi, Fengwei Zhang, and Angelos Stavrou. 2017. Breaking BLE beacons for fun but mostly profit. In Proceedings of the 10th European Workshop on Systems Security. 1-6, and Jianliang Wu, Yuhong Nan, Vireshwar Kumar, Dave Jing Tian, Antonio Bianchi, Mathias Payer, and Dongyan Xu. 2020. {BLESA}: Spoofing attacks against reconnections in bluetooth low energy. In 14th USENIX Workshop on Offensive Technologies (WOOT 20), and thus authentication is critical to impede such attacks.

System Overview

Motivating Example and Observation

To illustrate the importance of authentication for drone delivery, we describe a motivating example. At a Central Park concert with crowds picnicking on the lawn, a user orders a beverage. A delivery drone needs to authenticate the correct recipient among the crowd. Now consider that the drone is delivering an expensive bottle of wine, and a cabal of thieves want to steal that bottle. Thus, they launch relay attacks to have the thieves' drone deliver a cheap bottle to the unsuspecting recipient while having the legitimate drone deliver the expensive bottle to the thieves. For the prosperity of drone delivery, authentication is needed to defeat such attacks. Even when there are no attacks, there may be multiple drones delivering foods and beverages at the concert, and thus authentication is important to deliver them to the right recipients.

Having the recipient's smartphone send a one-time purchase code or show a QR code is very usable but insecure, as these approaches are vulnerable to relay attacks. Our observation is that the drone delivery service is different from many conventional services, such as a user authenticates herself at a bank by inputting a PIN or a customer checks out at a grocery store by scanning a QR code. In such conventional scenarios, one party (usually the customer) can trust an entity of the other party (usually the service provider) to conduct authentication, while in our case two entities from the two sides cannot trust each other at the beginning of authentication. This imposes unique challenges on drone-delivery authentication.

Authentication Approach

We propose a novel way of using face biometrics: two sides (e.g., the delivery drone and the user's smartphone in the drone-delivery application) record short videos containing the user's smile. By turning each frame in the videos into a face embedding, such as fps=4 or more, the authentication problem is converted into a dynamic face embedding comparison problem. It is dynamic as the timestamp of each captured image participates in the authentication process; for example, as the phone's video shows the user starts smiling, the drone's camera is supposed to observe it around the same time.

Figure 4:
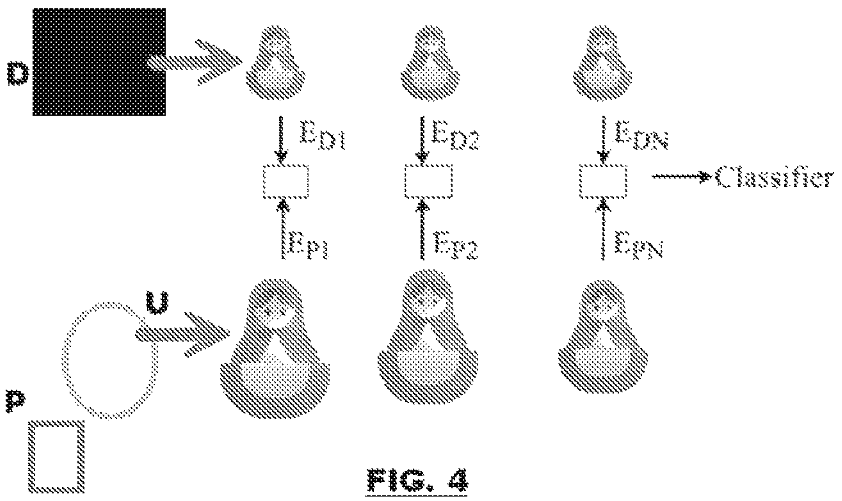
FIG. 4 shows one embodiment of a system design for the current disclosure.

As shown in FIG. 4, at each point in time i, a frame $D_i$ from the video recorded by the drone and a frame Pi from that by the phone constitute a pair. Face encoding is used to calculate embeddings $E_{Di}$ and $E_{Pi}$, and then a pairwise distance value, pdi–$D_e(E_{Di}, E_{pi})$, is calculated, where $D_e(\ )$ is the function for calculating the Euclidean distance. This way, the two videos are used to calculate a sequence of pairwise distance values. If the drone indeed records a video of the legitimate user, the pairwise distance values should be consistently small. On the other hand, for example, given a 3D printed mask attack, where the drone records the mask, since the user smiles (recorded by the user's smartphone) while the mask stays the same, the pairwise distance values fluctuate. Other attacks are discussed infra.

Our authentication approach uses the user's smartphone as a security token, which we assume is trustworthy and not accessible by the adversary. Stealing the user's password for the drone delivery service account does not suffice for cloning the security token, as long as a second factor (e.g., a one-time PIN sent via a text message or Duo Mobile app) is used and not compromised. A stolen smartphone cannot be simply used for attacking our authentication approach, as the smartphone has to be unlocked to conduct authentication. We consider the following representative procedure, although the details may vary depending on the deployment without changing the core authentication approach.

(1) User U places an order, e.g., using Amazon's shopping app installed on U's phone. Amazon assigns a drone D to fulfill the service.

(2) Once D arrives at the user-designated location, it hovers and establishes a communication channel, protected by k, with P. Then, D and P run a time-synchronization protocol, see Saurabh Ganeriwal, Ram Kumar, and Mani B Srivastava. 2003. Timing-sync protocol for sensor networks. In Proceedings of the 1st international conference on Embedded networked sensor systems. 138-149. Next, P generates a notification to let U know its arrival.

(3) U then walks to and unlocks to confirm that she is near and ready for a selfie. We assume has a circle of LED lights around its camera (which is available even on cheap cameras, see Adam Smith. 2021. Best On-Camera LED Light. improvephotography.com/69390/best-on-camera-led-light/), so it should be trivial for U to identify D's camera and stand in front of it. As shown in FIG. 3, radio relay attacks may have been launched and the drone hovering in front of may be a malicious one; we thus need authentication.

(4) P and D negotiate a time point to start recording. During the recording, P shows a random countdown; when it reaches 0, the user smiles. The recording lasts T seconds, which is studied as a parameter in the evaluation.

(5) P and D leverage face encoding to derive two sequences of embeddings and exchange them. P and D then independently decide whether the authentication is a success. Since they calculate based on the same data, it is trivial that they consent. If the authentication succeeds, the package delivery proceeds; otherwise, it goes back to Step 4 until the maximum number of attempts is reached. After authentication, all the videos are deleted.

Regarding the communication channel in Step (2), we assume both P and D can communicate with the courier company's server S; note both should already have a key-protected channel to communicate with S in order to set up the order (that is, P places the order at S and D accepts the command from S). The authentication merely reuses it. Alternatively, if Bluetooth peer-to-peer communication is used during authentication, the server can first distribute a session key to both P and D when an order is placed; or, P first receives the public key of D via the app, which is used to negotiate a session key. Any of the three ways can be used to establish a key-protected channel. Again, a key-protected communication channel does not exempt authentication, as it only ensures the data is not compromised but cannot guarantee the data is indeed sent from the drone in front of a user.

Handling Multiple Drones and Multiple Persons. If multiple drones hover in front of the user U, it is difficult for U to decide which drone is for her. A color can be randomly picked by the user's phone and is then displayed by both the phone and the drone's LED lights. When multiple drones display the same matched color and hover in front of U, it is difficult for U to decide which is the correct one even after the authentication succeeds. Note that even with distance bounding, see Brands, Distance-bounding 1993, the same issue can arise. Nevertheless, trivial measures can be used once authentication succeeds. For example, a drone, which keeps track of the face of the right recipient after the authentication success, reminds the user to face the drone's camera for a few seconds. If it finds the user indeed faces it, the drone then flashes its LED lights around its camera. This way, the user can identify the correct drone from multiple drones.

There may be multiple people from the view of D. After U confirms that she is near and ready for a selfie in Step 3, D only considers the face of the person standing nearest to the drone from its view. Regarding an attacker trying to rob, it is not a computable problem and can occur regardless of the authentication approach.

Based on the procedure, we can derive assumptions about P and D, which should be equipped with a camera and a navigator (such as GPS) and have certain communication/computation capabilities. Such devices are widely available.

Threat Model

An adaptive attacker who knows how Smile2Auth works may launch various attacks, such as using 3D-printed masks, adversarial examples, and even an identical twin to fool the drone.

Printed photos or adversarial examples. An attacker A may hold a photo of the victim user U or use a physical-world adversarial example, such as glasses, Mahmood Sharif, Sruti Bhagavatula, Lujo Bauer, and Michael K Reiter. 2016. Accessorize to a crime: Real and stealthy attacks on state-of-the-art face recognition. In Proceedings of the 2016 acm sigsac conference on computer and communications security (CCS). 1528-1540, to fool the drone D.

Naive mimicry attacks. We assume A has vision of U and thus mimics U's emotion to launch mimicry attacks. Perfect 3D-printed mask attacks (aka, twin-based mimicry attacks). Below is how we construct such attacks, where a user attacks herself. During a successful authentication, D and P (belonging to U) have recorded videos $V_D$ and $V_P$, respectively. Next, U watches the video $V_D$ (or $V_P$) to launch a mimicry attack by mimicking herself in the video, and D records another video $$V'_D.$$

The starting timestamps in $$V_P \text{ and } V'_D$$

are both forced as 0; and then the pair of videos, and $$V_P \text{ and } V'_D,$$

are considered as the videos taken by P and D due to a perfect 3D-printed mask attack. We consider it "perfect" as (1) the attacker effectively wears a "mask" looking exactly the same as U, and (2) unlike a static mask, the "mask" can mimic the emotion. Another way to understand the attack is that an identical twin, acting as the attacker, performs a mimicry attack against the other twin, thus also called a twin-based mimicry attack.

To our knowledge, none of the countermeasures for face recognition are resilient to such attacks. Since the perfect 3D-printed mask attacks (aka, twin-based mimicry attack) is much stronger than other attacks, our evaluation is focused on such attacks.

Streaming video attacks. In FIG. 3, the attacker A can hold a tablet; D' then records U and relays the live video to the tablet in order to fool D. Such attacks are a variant of attacks using a screen that displays a photo to fool the face recognition system. Admittedly, this is a relay attack designed against our authentication approach; however, effective countermeasures have been proposed. For example, multiple software-based methods, see Yaojie Liu, Amin Jourabloo, and Xiaoming Liu. 2018. Learning deep models for face anti-spoofing: Binary or auxiliary supervision. In Proceedings of the IEEE conference on computer vision and pattern recognition. 389-398, Di Wen, Hu Han, and Anil K Jain. 2015. Face spoof detection with image distortion analysis. IEEE Transactions on Information Forensics and Security 10, 4 (2015), 746-761, and Peng Zhang, Fuhao Zou, Zhiwen Wu, Nengli Dai, Skarpness Mark, Michael Fu, Juan Zhao, and Kai Li. 2019. FeatherNets: Convolutional neural networks as light as feather for face anti-spoofing. In Proceedings of the IEEE Conference on Computer Vision and Pattern Recognition Workshops. 0-0, can accurately detect whether it is a screen that displays the face. Since this is a separate well-studied problem, our work assumes one of the methods is deployed to defeat such attacks.

Robot-based mimicry attacks. The attacker may use a camera to record U's emotion and perform computer vision analysis; the live analysis results are then fed into a robot to mimic U, which we call robot-based mimicry attacks. There is a latency which involves reaction time due to video analysis, data transmission, planning, and controlling actuators. According to our survey of state-of-the-art robotic techniques, robotic imitation of human is actively studied but still very limited. For example, NAO, one of the leading humanoid robots, is frequently used by researchers for imitation; despite its high price ($9,000, see RobotoLab. 2020. NAO V6 price is $9000. robotlab.com/store/nao-power-v6-educator-pack), it has a delay of 200 ms to execute a prescribed motion, see Sylvain Filiatrault and Ana-Maria Cretu. 2014. Human arm motion imitation by a humanoid robot. In 2014 IEEE International Symposium on Robotic and Sensors Environments (ROSE) Proceedings. IEEE, 31-36. Another study shows the end-to-end delay from human-to-robot imitation is 1.72 seconds, see Gerard Canal, Sergio Escalera, and Cecilio Angulo. 2016. A real-time human robot interaction system based on gestures for assistive scenarios. Computer Vision and Image Understanding 149 (2016), 65-77, much larger than human-to-human imitation. The large reaction time probably cannot be resolved in the near future. We thus do not consider robot-based attacks in this work.

Design Choices

Figure 5:
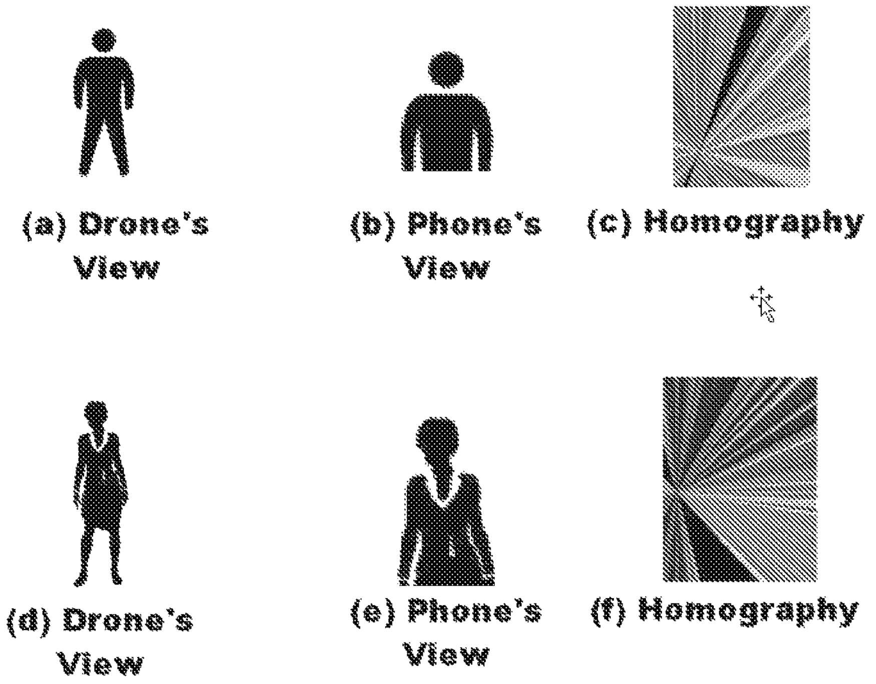
FIG. 5 shows an example of applying homography to drone and phone images.

Since our approach involves the comparison of two views from a drone and a phone, one may propose to use homography, see Daniel DeTone, Tomasz Malisiewicz, and Andrew Rabinovich. 2016. Deep Image Homography Estimation. arXiv:1606.03798, instead, which is a representative technique that aligns images. If two images align well, it indicates that the two images (by drone and phone) are probably taken at the same location, implying an authentication success. It maps the background landmarks of one image to another to align the images. Homography works well in two cases, see DeTone et al. 2016: two images are taken from the same plane with differing angles or the camera rotates around its x-axis. Our scenario does not fall in either. As a result, as illustrated in FIG. 5, although images are taken at the same place, the homography results are not legible, leading to false rejections. Our work thus does not adopt homography for video comparison.

We actually considered comparing houses, landscapes, and even gaits in videos. But we notice that (1) a face contains rich information and is "carried" by a person everywhere, (2) a smile contains dynamic information difficult to manipulate/mimic (even using 3D printing) but easy to make, and (3) thanks to the recent advances in face recognition, the rich information of a face, at each point in time, can be accurately encoded into an embedding that is easy to compare. We thus use a smile for authentication.

Studying Face Encoding Data

We first study the characteristics of the face encoding data in order to investigate the feasibility of the proposed approach. The study aims to answer the following questions. (1) The term "face encoding" may cause a misconception that, as long as the images contain the same face, they will have the same encoding regardless of the emotion changes. If this is true, a static 3D-printed mask can fool Smile2Auth, since our approach is established on the hypothesis that, given the same person, the encoding varies as the emotion changes. (2) How to decide a user has made facial expressions, such as a smile, grimace, or laugh? (3) The drone and the user's smartphone record videos from different angles. Are the pairwise distance values really small despite the different angles? Do the values fluctuate due to attacks?

Neighbor Distances Vs. Smile

To study the first question, that is, given a person, whether the face embedding varies as she smiles, we first analyze the videos taken by a user's smartphone (note the conclusion also applies to videos taken by the drone). Given N images in a video, their embeddings are represented as $E_1$, $E_2$, . . . , $E_N$, OpenCV is used as the face detector and FaceNet as the encoder. We then calculate the neighbor distance as $nd_i = \mathcal{D}_e(E_i, E_{i+1})$, where $i \in \{1, 2, \ldots, N-1\}$ and $\mathcal{D}_e$ is the Euclidean distance.

Figure 6:
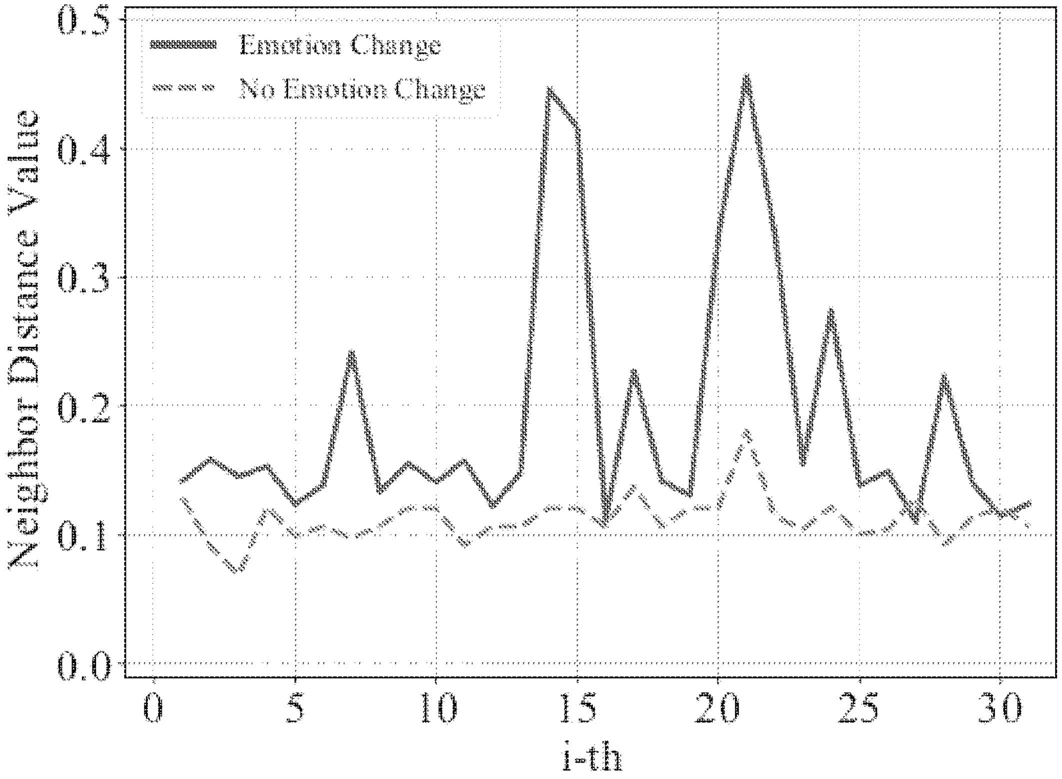
FIG. 6 shows a chart of neighbor distances.

FIG. 6 shows two sequences of neighbor distance values given the same user, who smiles (solid blue line) vs. does not smile (dotted green line). We can observe that when the user smiles, large neighbor distance values and fluctuations are incurred; otherwise, small. Such observations are true in other data instances. This confirms our hypothesis: given the same person, the encoding varies as her emotion varies. This observation is also leveraged to build the emotion-detection component (described infra) in order to answer the second question aforementioned.

Pairwise Distances vs. Attacks

Figure 7:
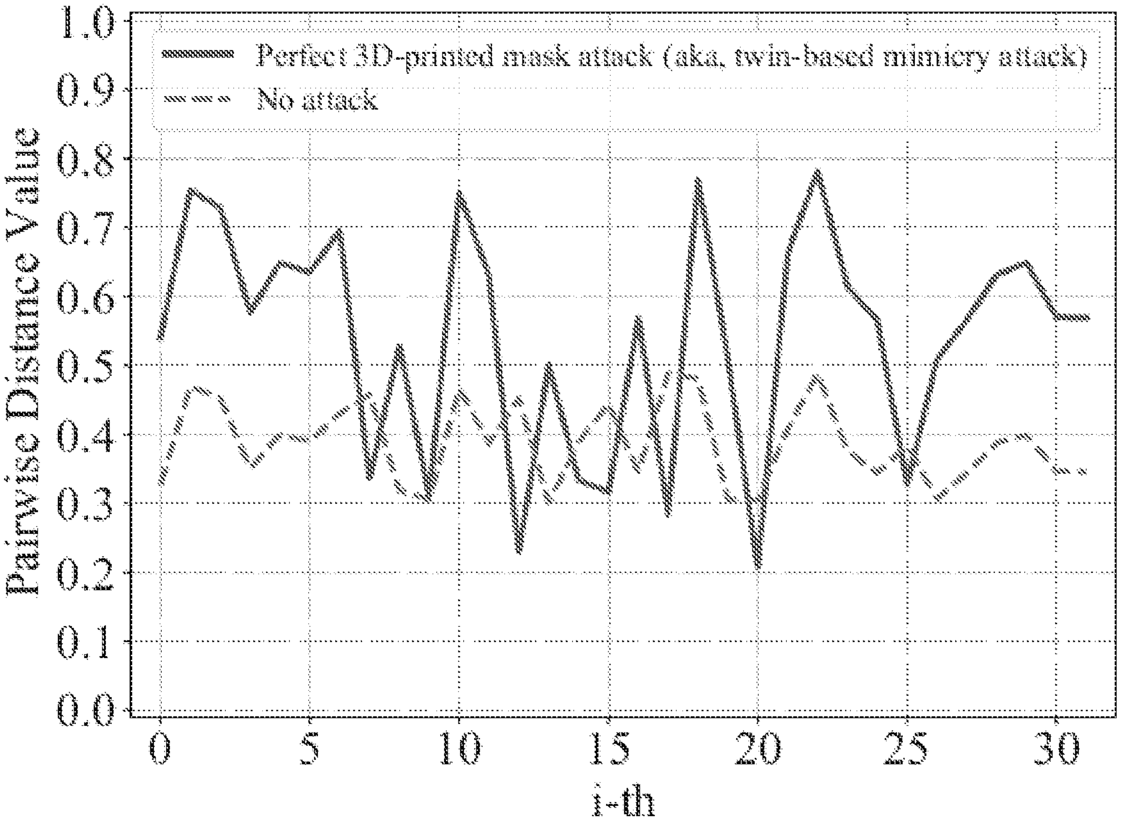
FIG. 7 shows a chart of pairwise distances.

The third question can be converted to the two sub-questions: (a) when a drone and a phone record the same smile, whether the resulting pairwise distance values are really low and have a small deviation; and (b) when there are attacks, whether the resulting pairwise distance values tend to be large and have a large deviation. To study this question, we plot the pairwise distances $\{pd_1, pd_2, \ldots, pd_N\}$ under different scenarios: no attacks and perfect 3D-printed mask attack (aka, twin-based mimicry attack). Our studies give very promising results. FIG. 7 illustrates that in the case of no attacks, the pairwise distance values keep low and have a small deviation, while in the case of attacks, they show large values and a larger deviation. Smile2Auth uses this observation to detect attacks.

System Details

The authentication procedure leads to a pair of videos recorded by the drone and the phone. Smile2Auth first detects whether the video recorded by the phone contains varied facial expressions. If no, Smile2Auth alerts the user to make facial expressions, such as smiling, when she retries. Otherwise, Smile2Auth continues to detect whether there is an attack. The authentication is a success only if it passes both the emotion detection and the attack detection.

Emotion Detection

If a user keeps a neutral face during the video recording but our system does not check it, it would make the attack easier since a static 3D-printed mask may be able to fool such a system. Smile2Auth thus first checks whether the video recorded by the phone contains changes in facial expressions. While there is much work on detecting a smile from static images, see Le An, Songfan Yang, and Bir Bhanu. 2015. Efficient smile detection by extreme learning machine. Neurocomputing 149 (2015), 354-363, Caifeng Shan. 2011. Smile detection by boosting pixel differences. IEEE transactions on image processing 21, 1 (2011), 431-436, and Jacob Whitehill, Gwen Littlewort, Ian Fasel, Marian Bartlett, and Javier Movellan. 2009. Toward practical smile detection. IEEE transactions on pattern analysis and machine intelligence 31, 11 (2009), 2106-2111, we leverage the observations herein to detect whether a video contains varied facial expressions, so they are not limited to a smile but other facial expressions also work.

We prepare a dataset of 392 data points; half of them contain a "natural smile" (labelled as positive) and the other half keep a "neutral face" (labelled as negative). Given a data point, we first convert the video into a sequence of neighbor distance values, from which the following statistical features are derived: minimum, maximum, difference between minimum and maximum, standard deviation, average, median absolute deviation, and median. These features are proposed based on the discussion herein, as they help distinguish the two types of curves in FIG. 6.

70% of the dataset is used for training and the rest for testing. A random forest model is then trained and the test accuracy is 100%. More importantly, we use this smile-detection model to check the large authentication dataset involving 30 participants, and all the data points pass the emotion detection with a success rate of 100%. According to our evaluation, even when the user makes a grimace or laughs, it can pass our emotion detection (trained using smiles). This is aligned with our purpose: Smile2Auth should abort the authentication and warn the user only when she has kept a static face during the authentication. We clarify that the result only means the good usability of Smile2Auth, in the sense that all the participants pass the emotion detection at a high rate. To demonstrate the resilience to attacks, we should check the results of attack detection.

Attack Detection

Given the pairwise distances $\{pd_1, pd_2, \ldots, pd_N\}$ derived from the pairs of images contained in the videos recorded by the drone and the phone, we use a classifier (SVM, k-NN, or random forest) to give the authentication result. (Note is determined by the fps and the video-recording duration, which are carefully studied as parameters.) Thus, the discussion herein has inspired us to use the following features: minimum, maximum, difference between minimum and maximum, standard deviation, average, median absolute deviation, and median. The same statistical features have been used for emotion detection, which is not surprising, as we use them to distinguish the two types of curves shown in FIG. 7. The attack detection results are presented infra.

Implementation

To build the prototype of Smile2Auth, different combinations of the face detector and the face encoding neural networks are tested. We used the toolbox Deepface, Sefik Ilkin Serengil and Alper Ozpinar. 2020. LightFace: A Hybrid Deep Face Recognition Framework. In 2020 Innovations in Intelligent Systems and Applications Conference (ASYU). IEEE, 23-27. doi.org/10.1109/ASYU50717.2020, to facilitate the implementation. Deepface is a lightweight framework containing stateof-the-art components for face recognition developed by Google, Facebook, and many others. For the face detector, we have considered, see OpenCV G. Bradski. 2000. The OpenCV Library. Dr. Dobb's Journal of Software Tools (2000), SSD, see Wei Liu, Dragomir Anguelov, Dumitru Erhan, Christian Szegedy, Scott E. Reed, Cheng-Yang Fu, and Alexander C. Berg. 2015. SSD: Single Shot MultiBox Detector. CoRR abs/1512.02325 (2015). arXiv:1512.02325 arxiv.org/abs/1512.02325, Dlib, Davis E. King. 2009. Dlib-ml: A Machine Learning Toolkit. Journal of Machine Learning Research 10 (2009), 1755-1758, and MTCNN, see Kaipeng Zhang, Zhanpeng Zhang, Zhifeng Li, and Yu Qiao. 2016. Joint Face Detection and Alignment using Multi-task Cascaded Convolutional Networks. CoRR abs/1604.02878 (2016). arXiv:1604.02878 arxiv.org/abs/1604.02878; for face encoding we have considered FaceNet, Florian Schroff, Dmitry Kalenichenko, and James Philbin. 2015. FaceNet: A Unified Embedding for Face Recognition and Clustering. CoRR abs/1503.03832 (2015). arXiv:1503.03832 arxiv.org/abs/1503.03832, Dlib, see King 2009, ArcFace, see Jiankang Deng, Jia Guo, and Stefanos Zafeiriou. 2018. ArcFace: Additive Angular Margin Loss for Deep Face Recognition. CoRR abs/1801.07698 (2018). arXiv:1801.07698 arxiv.org/abs/1801.07698, VGG-Face, see Omkar M. Parkhi, Andrea Vedaldi, and Andrew Zisserman. 2015. Deep Face Recognition. In Proceedings of the British Machine Vision Conference (BMVC), Mark W. Jones Xianghua Xie and Gary K. L. Tam (Eds.). BMVA Press, Article 41, 12 pages. doi.org/10.5244/C.29.41, DeepFace, see Yaniv Taigman, Ming Yang, Marc'Aurelio Ranzato, and Lior Wolf 2014. DeepFace: Closing the Gap to Human-Level Performance in Face Verification. In 2014 IEEE Conference on Computer Vision and Pattern Recognition. 1701-1708. doi.org/10.1109/CVPR.2014.220, and DeepID, see Yi Sun, Xiaogang Wang, and Xiaoou Tang. 2014. Deep Learning Face Representation by Joint Identification-Verification. CoRR abs/1406.4773 (2014). Each is developed utilizing different features and algorithms and as such generates different accuracy results. As we use them as black boxes and our authentication idea does not depend on the internals of these components, we omit the discussion of their details.

In our final design, OpenCV, see OpenCV G. Gradskit 2000, is used as the face detector and FaceNet, see Florian Schroff, Dmitry Kalenichenko, and James Philbin. 2015. FaceNet: A Unified Embedding for Face Recognition and Clustering. CoRR abs/1503.03832 (2015). arXiv:1503.03832 arxiv.org/abs/1503.03832 as the face encoding system. We choose this combination because of its high accuracy. For example, Table 2, see FIG. 8, shows the different accuracy values when different encoding systems are used. Note the large-scale evaluation details are presented infra.

Table 2, see FIG. 8, also shows that the authentication keeps a high accuracy even when some other encoding systems, such as Dlib and ArcFace, are used. It is worth highlighting we did not do any fine-tuning or retraining of the face-detection and face-encoding networks but used them off the shelf and attained the high accuracy, which reflects how robust our authentication approach is.

Data Collection

Figure 9:
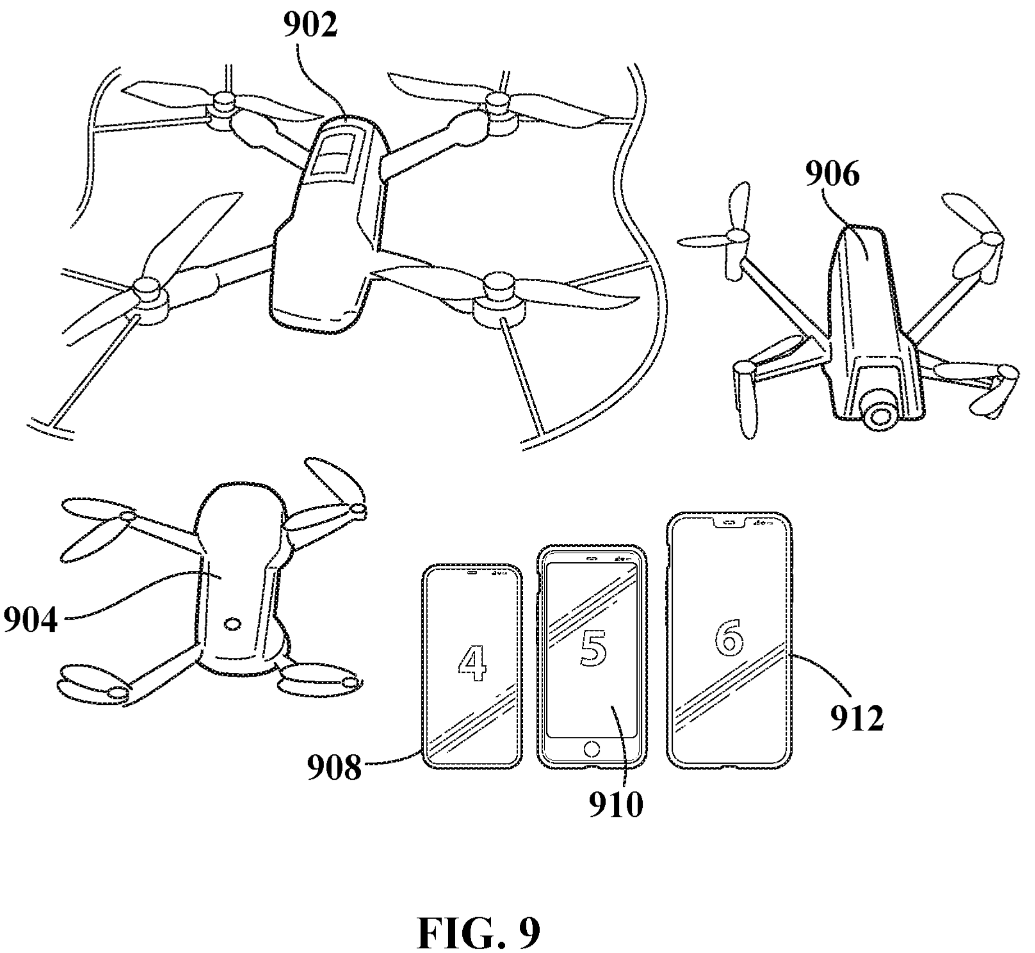
FIG. 9 shows one examples of tools used for an experimental setup.

This research was conducted under an IRB approval. FIG. 9 shows the devices used in our experiment, which include six (6) devices used in the experiment: a DJI Mavic 2 Zoom drone labeled 1 902, a DJI Mavic Mini drone labeled 2 904, a Parrot Anafi Thermal drone labeled 3 906, and 3 smartphones: a Honor View 10 labeled 4 908 an iPhone 6s Plus labeled 5 910 and a HTC One Plus 7 Pro labeled 6 912. Two datasets were built: (1)Dataset I is used to evaluate the accuracy of our system when there are no attacks (e.g., the drone records a wrong person). (2) Dataset II is used to determine the resilience of our system to attacks. We recruited 30 participants: 15 males and 15 females with ages ranging from 18-76. We include undergraduates, graduates, faculty members, engineers, and retired people in our experiments. The results presented herein show that when the data of ≥17 participants is used for training, the test accuracy reaches 100%. Also note Smile2Auth addresses a 1-to-1 verification problem, not a 1-to-n identification problem. Its accuracy does not inherently degrade as the user base grows. The size of 30 participants is comparable with other verification works; for example, ZEBRA (Oakland'14) recruited 20 participants, T2Pair (CCS'20) 20, and Touch-and-guard (UbiComp'16) 12.

Dataset I for Evaluating Accuracy

Figure 10:
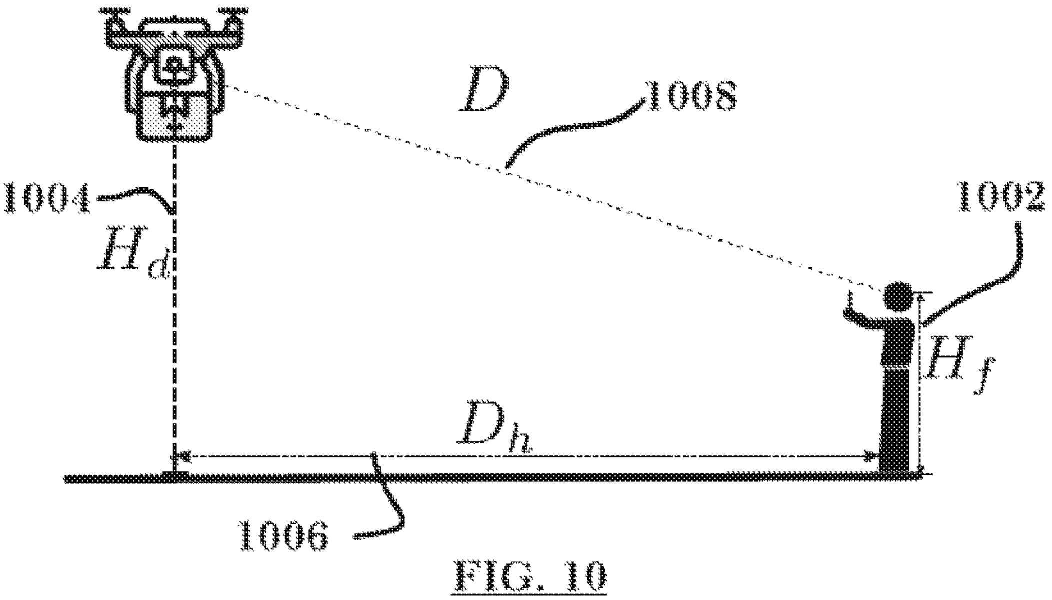
FIG. 10 shows Dataset I collection settings.

FIG. 10 shows how the data is collected. Dataset I collection settings. $H_f$ 1002 is approximately the user's height, $H_d$ 1004 is the hovering height of the drone, Dh 1006 is the horizontal distance between the drone and the user, and D is the face-drone distance. For example, when $H_f$=1.7 m, $H_d$=4 m and $D_h$ is 1.92, we have D=3 m. If a drone and a phone simultaneously record the same user's smile, the two videos constitute a positive data point (meaning an authentication success). If a drone records the user i while a phone records another user j, the two videos constitute a negative data point (meaning an authentication failure). For each face-drone distance (e.g., 4 m), 1,260 data points are collected (630 positives 630 negatives).

Dataset II for Evaluating Resilience to Attacks

Figure 11:
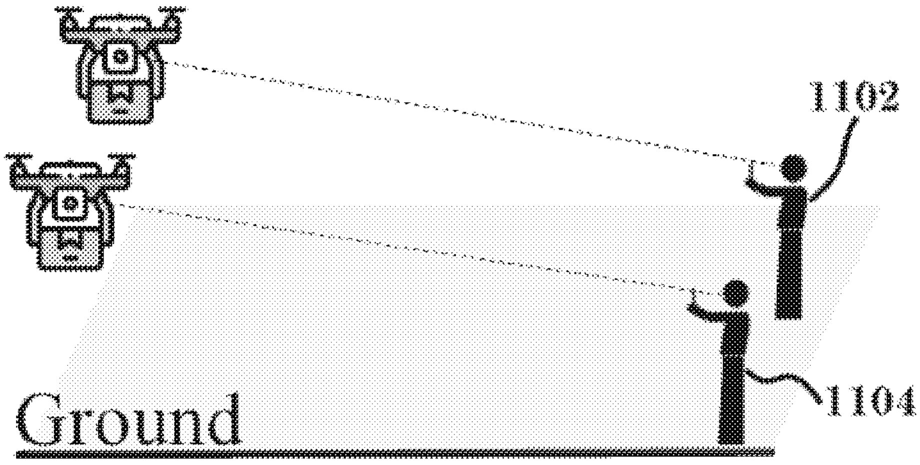
FIG. 11 shows Dataset II collection settings.

Dataset II(a). This dataset is built to test Smile2Auth's resilience to naive mimicry attacks. The videos of a randomly selected participant (as a victim 1102) are presented to another participant (as an attacker 1104). We allow the participant to repetitively watch the videos of the victim. When the attacker 1104 is confident enough, as shown in FIG. 11, the victim 1102 initiates authentication and the attacker 1104 launches the mimicry attack simultaneously. In total, 630 positive pairs (when a drone and a phone simultaneously record the same user) and 630 negative pairs due to the attacks are collected. (Note based on the accuracy study, we have a set of recommended setting, e.g., regarding the face-drone distance. So the attacks are all launched with the recommended setting.)

This dataset is used for testing Smile2Auth's resilience to perfect 3D-printed mask attacks (aka, twin-based mimicry attacks). A participant watches her own videos, replayed on a tablet placed in front of it, previously recorded by her phone to mimic herself to launch the attack. Positive pairs are generated when a drone and a phone simultaneously record a user's face, while negative pairs are generated consisting of a drone's video recording the attack-time face and the phone-recorded video being mimicked. In total, 630 positive pairs and 630 negative pairs are collected.

Evaluation

To evaluate Smile2Auth's accuracy, security, reliability, and usability, we designed three different real-world experiments: The first experiment studies the overall accuracy of Smile2Auth. The second tests the security of Smile2Auth under mimicry attacks. The third examines the reliability and usability of Smile2Auth under different parameters.

Accuracy

We use False Acceptance Rate (FAR), False Rejection Rate (FRR), Equal Error Rate (EER), and Area Under the Curve (AUC) of Receiver Operating Characteristics (ROC) to measure the accuracy of Smile2Auth. FAR is the rate at which our system identifies the attacker as the legitimate user and accepts pairing. For increased security having a lower FAR is crucial. FRR is the rate at which our system identifies the legitimate user as the attack and denies pairing. A lower FRR means higher usability for the end-user. EER is reported when FAR=FRR. AUC reflects the effectiveness of the system. We define accuracy as the proportion of correctly classified observations, i.e., Accuracy=(TP+TN)/(TP+TN+FP+FN), where TP is the number of true positives, TN is the number of true negatives, FP is the number of false positives, and FN is the number of false negatives.

Figure 12:
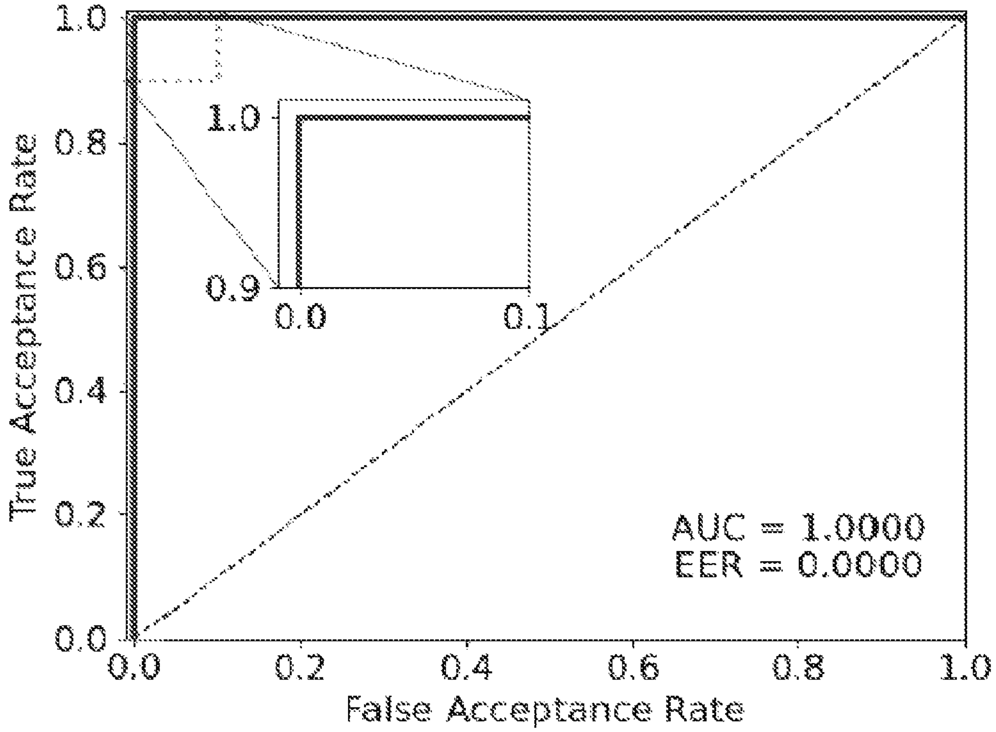
FIG. 12 shows a plot of ROC curve, EER, and AUC.

We first use Dataset I collected under the recommended setting to evaluate the accuracy of Smile2Auth. The recommended setting includes the face-drone distance=4 m, fps down sampled at 4, video recording duration=8, the inexpensive drone DJI Mavic 2 Zoom (price $2,150 on Amazon) is used (each of the parameters is studied infra). We employ the very strict Leave-One-Subject-Out (LOSO) method, similar to previous works, Michael Esterman, Benjamin J Tamber-Rosenau, Yu-Chin Chiu, and Steven Yantis. 2010. Avoiding non-independence in fMRI data analysis: leave one subject out. Neuroimage 50, 2 (2010), 572-576 and Xiaopeng Li, Fengyao Yan, Fei Zuo, Qiang Zeng, and Lannan Luo. 2019. Touch Well Before Use: Intuitive and Secure Authentication for IoT Devices. In The 25th Annual International Conference on Mobile Computing and Networking (MobiCom). 1-17. To achieve LOSO for our dataset we train the system on all but one participant's data and use that participant's data to test the system. We then compute the average performance by iterating over all participants. This enables us to make sure the system is usable on participants it has not seen during training. As shown in FIG. 12 the average EER is 0.0 and AUC is 1.0.

Mimicry Attacks

Resilience to Naive Mimicry Attacks. This section evaluates Smile2Auth's resistance to naive mimicry attacks. Dataset II(a) was used to determine the capability of Smile2Auth to resist naive mimicry attacks. A naive mimicry attack occurs when one participant tries to mimic a previous participant's dataset without the use of a twin.

We asked participants to mimic another participant's previously recorded datasets. Each participant was shown a portion of another participant's previous dataset at random. The participants performed two rounds of mimicry attacks. In the first round of mimicry attacks, the participants were not allowed to review the previous dataset and had to mimic the live video. In the second round of mimicry attacks, the participants were allowed to memorize the previous dataset and then attempt to mimic the live video.

Figure 13:
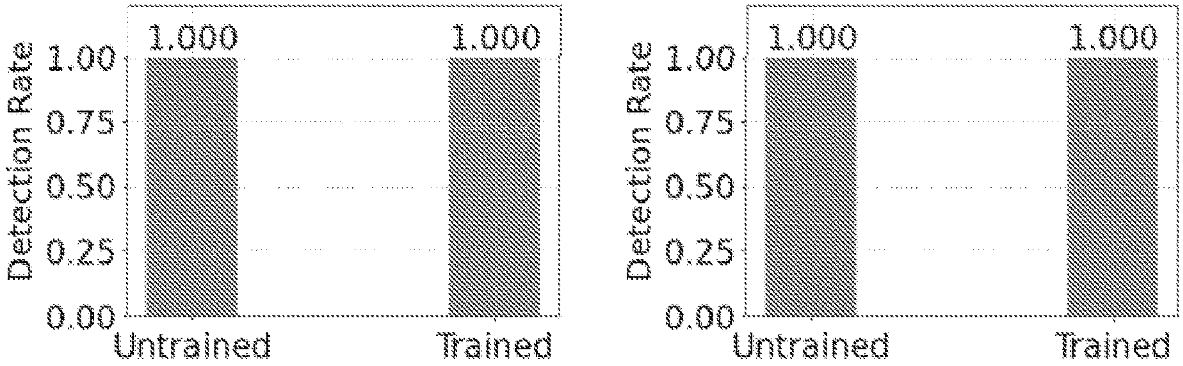
FIG. 13 shows a graph of resilience against twin-based mimicry attacks.

Naive Mimicry Attacks—Untrained. As shown in FIG. 13 at a Smile2Auth can successfully defend against untrained adversarial users using Naive mimicry attacks with 100% detection rate.

Naive Mimicry Attacks—Trained. As shown in FIG. 13 at a Smile2Auth can successfully defend against trained adversarial users using Naive mimicry attacks with 100% detection rate.

Resilience to Perfect 3D-printed Mask Attacks. This section evaluates Smile2Auth's resistance against 3D printed twin-based mimicry attacks. We use Dataset II(b) to determine the resilience of Smile2Auth against mimicry attacks.

We asked participants to try and mimic their previously recorded datasets. The strictest form of mimicry attack is where one mimics herself. Each participant was shown a portion of their previous dataset at random. The participants performed two rounds of mimicry attacks. The first round of mimicry attacks the participants were not allowed to review their previous dataset and had to mimic the live video. The second round of mimicry attacks the participants were allowed to memorize the previous dataset and then attempt to mimic the live video.

Twin-based Mimicry Attacks—Untrained. As shown in FIG. 13 at b, Smile2Auth successfully defends against untrained adversaries using twin-based mimicry attacks with 100% detection rate.

Twin-based Mimicry Attacks—Trained. Steps to train the adversarial user can be found in Dataset II. As shown in FIG. 13 at b Smile2Auth successfully defends against trained adversaries using twin-based mimicry attacks with 100% detection rate.

Parameter Study

To study the effects that certain parameters have on our model we design the experiments as such and change the parameter that is to be studied: The participant is 4 meters away from the drone, the drone is a DJI Mavic 2 Zoom with optical zoom of 2× magnification enabled, the participant records using the One Plus 7 Pro front-facing selfie camera.

Figure 14:
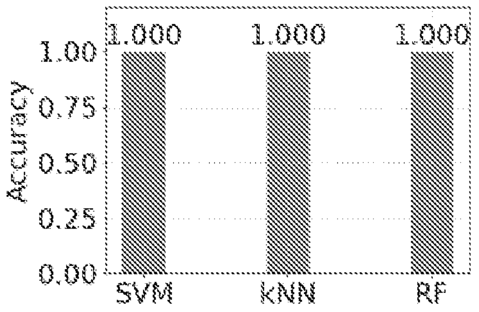
FIG. 14 shows graphs of parameter study data.
Figure 14:
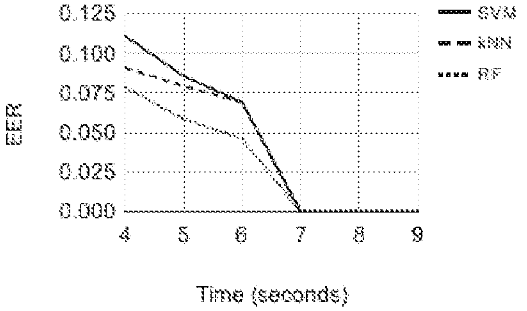
Figure 14:
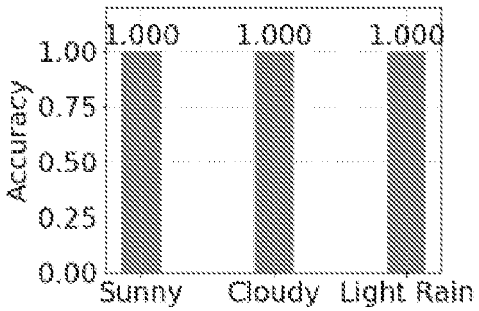
Figure 14:
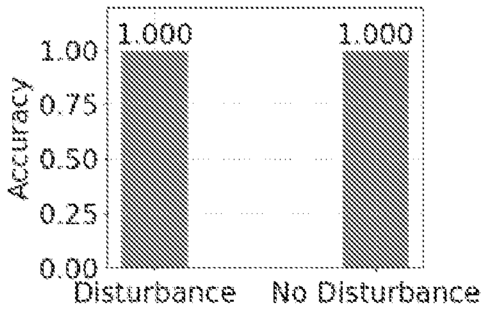
Figure 14:
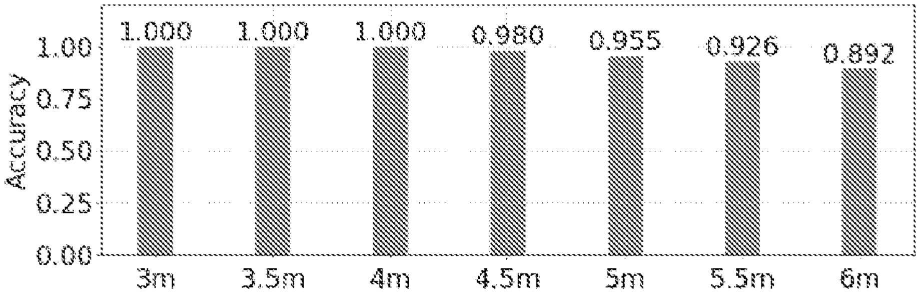
Figure 14:
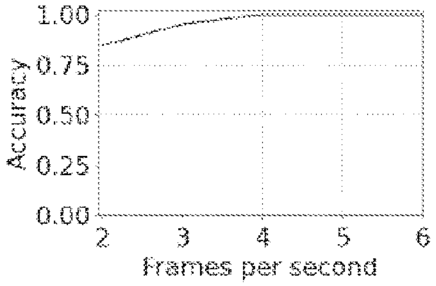
Figure 14:
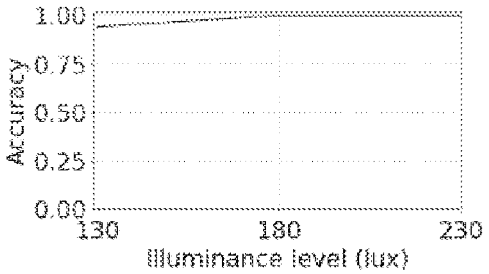
Figure 14:
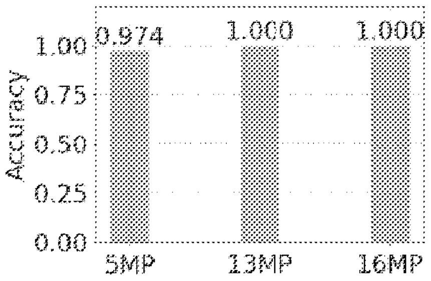
Figure 14:
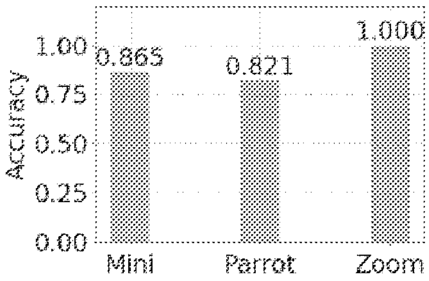
Figure 14:
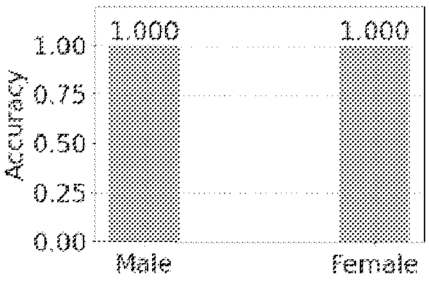
Figure 14:
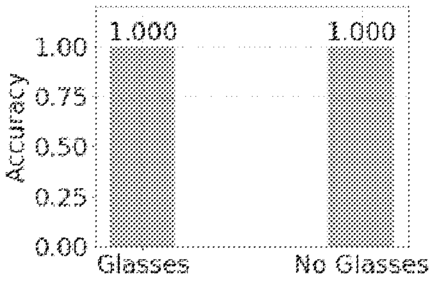
Figure 14:
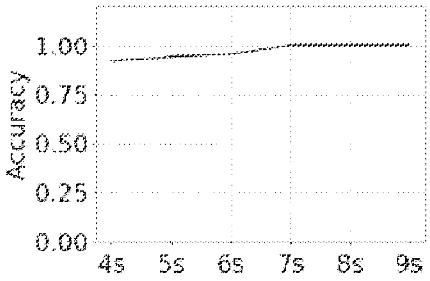
Figure 14:
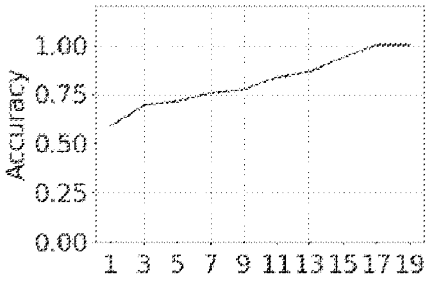
Figure 14:
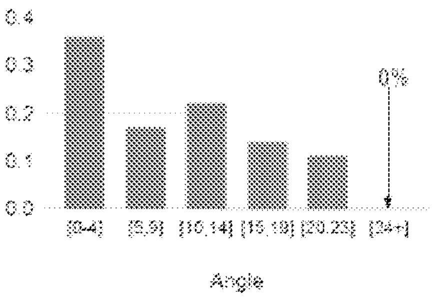
Figure 14:
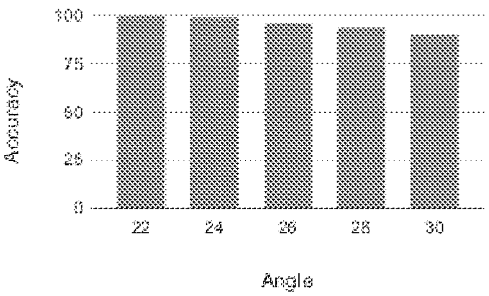

Classifiers. We train the model with different classifiers SVM, kNN, and RF to determine their effect on system accuracy. To determine the optimal parameters for SVM we tested linear, polynomial, and radial basis function (RBF) kernels. The optimal parameters were set at c=20, =0.1 and the kernel set to RBF. For kNN, we test the value of k and we select 19 as the optimal parameter. To determine the optimal parameters for RF we test the number of trees, ranging from 50 to 200, and select 60 as the optimal value. FIG. 14 at a shows that all classifiers perform the same at 4 m using 8 s of videos. To make Smile2Auth more usable for the end-user, we wanted to test different video lengths for emotion change. FIG. 14 at b shows the comparison between 4 s, 5 s, 6 s, 7 s, 8 s, and 9 s of video utilizing Leave-One-Subject-Out training fed to the SVM, kNN and RF models. In almost every test SVM was the least accurate algorithm, RF was the most accurate algorithm, and kNN was in between.

Smartphone Camera Quality. Not everyone is going to have the latest and greatest smartphone so we need to determine how smartphone camera quality is going to affect Smile2Auth. To determine the effect of camera quality, we employ the use of 3 different phones. Besides the One Plus 7 Pro with a 16 Megapixel (MP) front camera that was used to collect Dataset I and Dataset II, we use an iPhone 6s Plus with a 5 Megapixel front camera and an Honor View 10 with a 13 MegaPixel front camera. As shown in FIG. 14 at c, lowering the quality of the photos reduces the accuracy of our model slightly.

The parameter study illustrates just how robust and secure Smile2Auth is. Most parameters do not affect the accuracy of our model. As with most facial recognition models, camera quality has a large part to play in how accurate a model is. FIG. 14 at c demonstrates how selfie camera quality affects accuracy. When the smartphone camera is 5 MegaPixels the accuracy drops to 97.4%. When the smartphone camera quality increases to 13MP the accuracy of Smile2Auth increases to 100%.

Drones. The DJI Mavic 2 Zoom was used to collect Dataset I and Dataset II. We collected data with two other drones: a DJI Mavic Mini and a Parrot Anafi Thermal. The DJI Mavic 2 Zoom shot video in 4 k resolution. The DJI Mavic Mini shot a video in 2.7 k resolution. The Parrot Anafi Thermal shot a video in 720p resolution.

FIG. 14 at d shows how switching drones affects the accuracy while keeping the same distance between the user and drone. The DJI Mavic Mini has an accuracy of 86.5%, the Parrot Anafi Thermal drone has an accuracy of 82.1% and the DJI Mavic 2 Zoom has an accuracy of 100%. The drop in accuracy can be explained by two different factors: no optical zoom and camera quality. The Parrot Anafi Thermal and DJI Mavic Mini do not have optical zoom, and the camera quality of these two drones is far below the DJI Mavic 2 Zoom. The DJI Mavic Mini records at 2.7 k resolution while the DJI Mavic 2 Zoom records at 4 k resolution. We thus recommend a setting similar to the inexpensive drone DJI Mavic 2 Zoom ($2,150 on Amazon): 2× optical zoom and 4K resolution.

Weather. Weather is constantly changing and to make sure that Smile2Auth can perform accurately during different weather conditions we need to collect data when those conditions are present. Data collection occurred over the course of several months during which various weather conditions such as sunny, cloudy, and light rain were present. FIG. 14 at e shows the accuracy of Smile2Auth during different weather conditions did not change.

Facial Disturbance. During use users may have an itch on their face or need to readjust their glasses. To determine how a user interacting with their face during recording would affect the accuracy of Smile2Auth the participants were encouraged to scratch their face, rub their nose or fix their glasses at random. The results shown in FIG. 14 at f, determine that these facial disturbances did not affect Smile2Auth.

Gender. In order to make sure Smile2Auth has a robust model we need to determine the effect gender has on our model. After grouping the participants by gender, FIG. 14 at g demonstrates that Smile2Auth has a robust model and gender does not affect the accuracy.

Wearing Glasses. Delivery drones need to deliver to everyone regardless of if they have glasses or not. To determine how glasses affect the accuracy of Smile2Auth we set that as a parameter. Half of the participants had glasses and half did not. The results shown in FIG. 14 at h, determine that Smile2Auth will keep the same accuracy if the user has glasses or not.

Distance between drone and face. We test Smile2Auth over different distances. The distance to the participant was changed from 3m-6m at 0.5 m intervals. As shown in FIG. 14 at i, the accuracy keeps 100% when the distance is up to 4 m and degrades slowly when it further grows. We chose the distance of 4m as it was the furthest distance that maintained 100% accuracy.

Video length. To study the impact that changing the total length of time for each sample had on our system. We changed the length from 4 seconds to 9 seconds increasing by 1 second per trial. We trained our model on each new time frame and the results are outlined in FIG. 14 at j. As shown in the figure as the length of time increases the accuracy of Smile2Auth increases.

Size of training dataset. We vary the size of the training dataset to study its impacts on system performance. The size of the training dataset is defined as the number of participants for training our model. We denote the participants as t, and train Smile2Auth with t (1≤≤19 with a step of 2) and test it against the rest of the participants (30-). As shown in FIG. 14 at k, the accuracy steadily grows as the number of participants grows; as the number of participants reaches 17, the accuracy already reaches 100%. This shows another advantage of the approach: compared to traditional biometrics-based approaches needing a huge training dataset, a small dataset in our system suffices.

Frames per second (fps). We evaluate the impact of varying the frames captured per second. We vary the generation of frames from 2 fps to 6 fps. As shown in FIG. 14 at 1, fps above 4 stays at 100% accuracy. To reduce the storage and memory required we choose to keep the fps at 4 as it is the lowest value maintaining 100% accuracy.

Delivery at night. We evaluate the impact of light level present during delivery. We vary the illuminance level (using units of lux) from 130 lux to 230 lux. As shown in FIG. 14 at m, a light level above 180 lux maintains 100% accuracy. We achieve 180 lux during night time by equipping the drone with cheap LED lights. See, Amazon. 2022. STARTRC. View Angle. We then evaluate the impact of the view angle on accuracy. We define a view angle between the face and the drone as 0 degree when the user faces the drone right in front of its camera.

During our data collection, the drone hovering around 4m high and the face-drone distance is kept at 4m (keep in mind that the face also has a height). We use FSA-Net, Tsun-Yi Yang, Yi-Ting Chen, Yen-Yu Lin, and Yung-Yu Chuang. 2019. FSA-Net:Learning Fine-Grained Structure Aggregation for Head Pose Estimation From a Single Image. In 2019 IEEE/CVF Conference on Computer Vision and Pattern Recognition (CVPR). 1087-1096. doi.org/10.1109/CVPR.2019.00118 to measure the view angle and FIG. 14 at n shows a histogram of the view angles in our dataset, see supra. The maximum angle in our dataset is 23 degrees, and for all the different view angles the accuracy is 100%. We then have the participants face the drone camera at larger view angles from 24 to 30 degrees, and FIG. 14 at o shows the accuracy degrades slightly as the degree increases. Note as a drone can fly freely, it can adjust its angle facing the user to keep the view angle small.

Authentication Time

The time taken for the authentication process, since the user stands in front of the drone, includes time spent recording videos, time spent on initiating the authentication, time taken for computing and exchanging embeddings, and making the authentication decision. The recommended time spent recording videos is 8s. It takes less than 2s for initiating the authentication, computing and exchanging embeddings, and making the authentication decision. The average total time taken for authentication is 10s.

Summary

The evaluation shows that Smile2Auth is resilient to strong attacks, including the twin-based mimicry attacks (aka, perfect 3D-printed mask attacks). The resilience can be attributed to human reaction time, as the average human reaction time is larger than 200 ms, see T. P. Ghuntla, H. B. Mehta, P. A. Gokhale, and C. J. Shah. 2012. A Comparative Study of Visual Reaction Time in Basketball Players and Healthy Controls. National Journal of Integrated Research in Medicine 3, 1 (2012), Aditya Jain, Ramta Bansal, Avnish Kumar, and K. D. Singh. 2015. A comparative study of visual and auditory reaction times on the basis of gender and physical activity levels of medical first year students. International Journal of Applied & Basic Medical Research 5, 2 (2015), and McGehee et al. 2000, and such a time difference is detected as attacks by our model.

The parameter study illustrates how robust Smile2Auth is when the different parameters are examined, including classifier, camera quality, drone, weather, facial disturbance (e.g., scratching face), gender, glasses, length of time, and the training data size (i.e., the number of participants). As shown by the parameter study results, they barely affect the accuracy of Smile2Auth. The reason these parameters do not affect the model is that they affect both videos in the same/similar way. Changes that occur in one video usually occur in the other (except the view angel); thus, the distance values between embeddings keep low.

The parameter study also helps give guidelines for the drone delivery companies: delivery drone companies should ensure their drones have cameras that are capable of taking videos at 4 k resolution with 2× optical zoom. Such a specification can be found on cheap drones, including those beginner drones used in our evaluation.

Also, optical zoom lenses can help the drone hover at a larger distance, and they are also widely available on inexpensive drones ($2,150 on Amazon for a beginner drone DJI Mavic 2 Zoom).

Usability

In order to understand the usability of Smile2Auth, we asked the participants for feedback in the form of a questionnaire. The following questions were adapted from the system usability scale questions, see John Brooke. 1996. SUS: a "quick and dirty' usability. Usability evaluation in industry (1996), 189.

Questions: "On a scale of from 1 to 5, 1 being strongly disagree and 5 being strongly agree. Please rate the following six statements. (1) The authentication method was easy to learn. (2) The authentication method was easy to use. (3) The authentication method was convenient. (4) The authentication method did not make me feel uncomfortable. (5) I am satisfied with the amount of time it took to complete the authentication. (6) Using the system would require help from someone who is technical."

Figure 15:
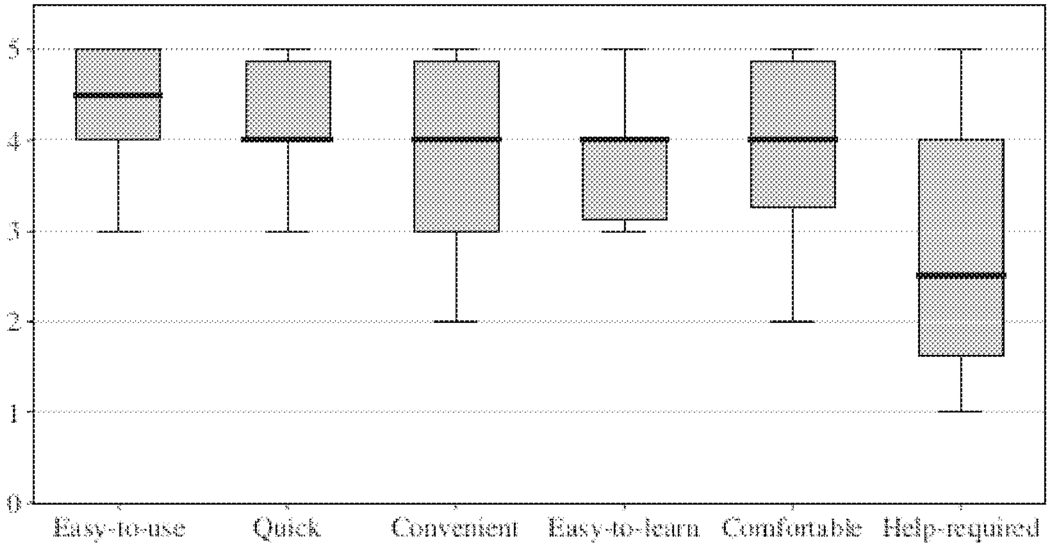
FIG. 15 shows questionnaire results for a usability study.

FIG. 15 describes the responses to the 6 statement questionnaire given to participants. We are looking for how easy each authentication was to the individual, how comfortable each individual was with how long it took to authenticate, how convenient each method was, how easy to learn each individual found the authentication methods, how comfortable each individual was using each method, and if the individual felt they would need help to understand how each method was used.

The scores outlined in FIG. 15, show that participants find Smile2Auth easy to use. They are comfortable with the amount of time it takes to authenticate. Participants find Smile2Auth convenient to use and easy to learn. They are comfortable using Smile2Auth as an authentication method. Participants find that they do not need much help for using Smile2Auth or understanding how Smile2Auth works. For those participants that need help learning how to use Smile2Auth, we can provide a short tutorial video demonstrating how to use the system. This would clear up any confusion that users may have.

Smile2Auth can be categorized as correlation-based authentication. Many well-known systems are proposed in this direction, see Nikolaos Karapanos, Claudio Marforio, Claudio Soriente, and Srdjan Capkun. 2015. Sound-Proof: Usable Two-Factor Authentication Based on Ambient Sound. In 24th USENIX Security Symposium (USENIX Security), Xiaopeng Li, Fengyao Yan, Fei Zuo, Qiang Zeng, and Lannan Luo. 2019. Touch Well Before Use: Intuitive and Secure Authentication for IoT Devices. In The 25th Annual International Conference on Mobile Computing and Networking (MobiCom). 1-17, Shrirang Mare, Andrés Molina Markham, Cory Cornelius, Ronald Peterson, and David Kotz. 2014. Zebra: Zero-effort bilateral recurring authentication. In IEEE Symposium on Security and Privacy (Oakland). See, Shrirang Mare, Reza Rawassizadeh, Ronald Peterson, and David Kotz. 2018. SAW: Wristband-based Authentication for Desktop Computers. Proceedings of the ACM on Interactive, Mobile, Wearable and Ubiquitous Technologies 2, 3 (2018), 1-29 and Wu et al. 2022. For example, ZEBRA, see Mare et al. 2014, authenticates a desktop user by comparing the activity sequence inferred from IMU data, collected by the user's smartwatch, against actual operations on the mouse and keyboard. Along this direction, Smile2Auth is proposed for drone delivery, carrying many prominent advantages over existing authentication approaches for drone delivery (see FIG. 1, Table 1). G2Auth, Id., is a very recent work for drone-delivery authentication, which compares the IMU data on the user smartphone side and the video data on the drone side. Compared to G2Auth, the authentication "gesture" in Smile2Auth is merely a smile, and the accuracy of Smile2Auth is higher. Moreover, object tracking of a phone in G2Auth can be affected by the background, while face detection and representation used in Smile2Auth is very mature. Plus, the amount of transmitted data is smaller in Smile2Auth, as it only transmits four embedding values per second.

Patents and research works, see Thomas D Erickson, Kala K Fleming, Clifford A Pickover, and Komminist Weldemariam. 2018. Drone used for authentication and authorization for restricted access via an electronic lock. U.S. Pat. No. 9,875,592, Shriram Ganesh and Jose Roberto Menendez. 2016. Methods, systems and devices for delivery drone security. U.S. Pat. No. 9,359,074 and Chandrashekar Natarajan, Donald R High, and V John J O'Brien. 2020. Unmanned aerial delivery to secure location. U.S. Pat. No. 10,592,843, Soundarya Ramesh, Thomas Pathier, and Jun Han. 2019. SoundUAV: Towards Delivery Drone Authentication via Acoustic Noise Fingerprinting. In Proceedings of the 5th Workshop on Micro Aerial Vehicle Networks, Systems, and Applications. 27-32, and Frederik Schaffalitzky. 2016. Human interaction with unmanned aerial vehicles. U.S. Pat. No. 9,459,620 have been devoted to solving the important authentication problem. But secure and usable authentication solutions resilient to relay attacks, see Lishoy Francis, Gerhard P Hancke, Keith Mayes, and Konstantinos Markantonakis. 2011. Practical Relay Attack on Contactless Transactions by Using NFC Mobile Phones. IACR Cryptology ePrint Archive 2011 (2011), Gerhard P Hancke. 2005. A practical relay attack on ISO 14443 proximity cards. Technical report, University of Cambridge Computer Laboratory 59 (2005), 382-385, Hildur Olafsdóttir, Aanjhan Ranganathan, and Srdjan Capkun. 2017. On the security of carrier phase-based ranging. In International Conference on Cryptographic Hardware and Embedded Systems. Springer, 490-509, and José Vila and Ricardo J. Rodriguez. 2015. Practical Experiences on NFC Relay Attacks with Android. In Radio Frequency Identification still lack. For example, a Walmart's patent, see Natarajan et al. 2010, proposes to deploy a user-side lockbox, which is installed with a beacon tag and a receiver, to conduct mutual authentication; plus, it is still vulnerable to relay attacks. Many studies are done about UAVs, such as fighting fake video timestamps, see Zhipeng Tang, Fabien Delattre, Pia Bideau, Mark D Corner, and Erik Learned-Miller. 2020. C-14: assured timestamps for drone videos. In Proceedings of the 26th Annual International Conference on Mobile Computing and Networking. 1-13, and audio side channels, see Adeola Bannis, Hae Young Noh, and Pei Zhang. 2020. Bleep: motor-enabled audio side-channel for constrained UAVs. In Proceedings of the 26th Annual International Conference on Mobile Computing and Networking. 1-13.

Unlike biometrics-based authentication, see Alexander De Luca, Alina Hang, Frederik Brudy, Christian Lindner, and Heinrich Hussmann. 2012. Touch me once and I know it's you!: Implicit Authentication based on Touch Screen Patterns. In Proceedings of the SIGCHI Conference on Human Factors in Computing Systems. See, Mario Frank, Ralf Biedert, Eugene Ma, Ivan Martinovic, and Dawn Song. 2012. Touchalytics: On the Applicability of Touchscreen Input as a Behavioral Biometric for Continuous Authentication. IEEE Transactions on Information Forensics and Security 8, 1 (2012), see Jun Han, Shijia Pan, Manal Kumar Sinha, Hae Young Noh, Pei Zhang, and Patrick Tague. 2017. Sensetribute: Smart Home Occupant Identification via Fusion Across On-Object Sensing Devices. In Proceedings of the 4th ACM International Conference on Systems for Energy-Effcient Built Environments (BuildSys). See, Mark R. Hodges and Martha E. Pollack. 2007. An 'Object-Use Fingerprint': The Use of Electronic Sensors for Human Identification. In UbiComp 2007: Ubiquitous Computing, Yuxin Meng, Duncan S Wong, Roman Schlegel, et al. 2012. Touch gestures based biometric authentication scheme for touchscreen mobile phones. In International Conference on Information Security and Cryptology, Juhi Ranjan and Kamin Whitehouse. 2015. Object Hallmarks: Identifying Object Users Using Wearable Wrist Sensors. In Proceedings of the 2015 ACM International Joint Conference on Pervasive and Ubiquitous Computing (UbiComp), Napa Sae-Bae, Kowsar Ahmed, Katherine Isbister, and Nasir Memon. 2012. Biometric-rich gestures: a novel approach to authentication on multi-touch devices. In Proceedings of the SIGCHI Conference on Human Factors in Computing Systems, Hataichanok Saevanee and Pattarasinee Bhatarakosol. 2008. User authentication using combination of behavioral biometrics over the touchpad acting like touch screen of mobile device. In International Conference on Computer and Electrical Engineering, Mohamed Shahin, Ahmed Badawi, and Mohamed Kamel. 2007. Biometric authentication using fast correlation of near infrared hand vein patterns. International Journal of Biological and Medical Sciences 2, 3 (2007), and Jing Tian, Chengzhang Qu, W. Xu, and Song Wang. 2013. KinWrite: Handwriting-Based Authentication Using Kinect. In NDSS, Smile2Auth does not need to collect the user biometric information and has no concern that a user's face may change over time (e.g., wearing sunglasses or makeup).

Some users may have privacy concerns about the drone recording their faces. But note the approach of Smile2Auth does not need users to enroll their biometric information and the courier company does not need to store any of the videos for providing the service. On the other hand, if a courier company is evil, it can use its drones to record users regardless of our approach. Smile2Auth works well under various weather conditions during our experiments. We have not tested very foggy weather yet. However, DJI's manual, e.g., requires "do not use the aircraft in severe weather conditions including wind speeds exceeding 8 m/s, snow, rain, and fog", see DJI. 2019. User Manual for Mavic Mini. dl.djicdn.com/downloads/Mavic_Mini/ Mavic_Mini_User_Manual_vi.0_en.pdf. Indeed, if the fog is so heavy, the safety of drones probably becomes an issue, see MavicPilot. 2018. Flying in Fog: Beware! mavicpilots-.com/threads/flyingin-fog-beware.39412/; in that case, the delivery should not be conducted in the first place.

Compared to lockbox based authentication, Smile2Auth has a limitation that requires the user to be present for package delivery. We regard Smile2Auth to be complementary to such approaches for these reasons: (1) Smile2Auth does not rely on infrastructure like lockboxes, so Smile2Auth helps the deployment of drone delivery in rural areas; (2) depending on the distance of the lockbox, a user may prefer to send/receive a package on her lawn than drive/walk to the lockbox; and (3) unless distance bounding becomes mature and widely deployed, existing lockbox solutions (such as Chandrashekar Natarajan, Donald R High, and V John J O'Brien. 2020. Unmanned aerial delivery to secure location. U.S. Pat. No. 10,592,843) are still vulnerable to relay attacks.

Drone delivery is an emerging service with a quickly growing market and thus its authentication is an important research problem. Due to the uniqueness of drone delivery, authentication approaches that require human-drone physical contact or very close proximity are not applicable. We have presented a secure and usable authentication approach, Smile2Auth, for drone delivery. It leverages biometric information of faces; however, unlike traditional biometrics-based approaches, it does not need users to enroll their biometric information.

Smile2Auth attains an accuracy of 100% using off-the-shelf face recognition components (i.e., without any fine-turning or retraining). The evaluation has considered strong attacks, including perfect 3D-printed masks, aka, twin-based mimicry attacks. It is the first face-biometrics-based approach that is resilient to such strong attacks.

We studied a variety of parameters, such as classifier, camera quality, drone, weather, video length, and number of participants. The results show that Smile2Auth is highly accurate, secure, and robust. We envision that Smile2Auth can advance the deployment of drone delivery and thus reduce human contact during the pandemic regarding deliveries that otherwise require signatures. The novel way of using face biometrics may be applied to other scenarios, such as authentication for ride-sharing or mobile robots.

Further embodiments are illustrated in the following Examples which are given for illustrative purposes only and are not intended to limit the scope of the disclosure.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth. The authentication technique can be used for authenticating any service provided by a robot, car, drone or any other service-providing devices.

What is claimed is:

1. An authentication technique for drone-user interaction comprising:

at least one drone configured to remain at a distance from the user during authentication and to capture the at least one drone video of the user while the user simultaneously captures the at least one user video;

at least one user with at least one device comprising a smartphone that captures the at least one user video as session-specific ground truth for authenticating the drone without requiring prior enrollment of the user's biometric information;

wherein the at least one drone and the at least one device take at least one drone video and at least one user video of the user substantially simultaneously during a same authentication session after negotiating a start time for recording;

encoding at least one frame of the at least one drone video and at least one frame of the at least one user video to form at least one first embedding sequence and at least one second embedding sequence of at least one aspect of the user by encoding corresponding frames from the at least one drone video and the at least one user video into timestamp-associated face embeddings arranged in temporal order;

comparing the at least one first embedding and the at least one second embedding to determine at least one distance value, wherein correlation of the at least one distance value derived from the at least one drone video and the at least one user video authenticate the at least one drone and at least one user with one another by determining a sequence of pairwise distance values between temporally corresponding embeddings from the at least one drone video and the at least one user video and authenticating only when the sequence remains consistently low over time.

2. The authentication technique for drone-user interaction of claim 1, wherein the at least one aspect of the at least one user is the at least one user's face.

3. The authentication technique for drone-user interaction of claim 2, wherein the at least one drone directs the at least one user to vary the at least one aspect of the at least one user's face by making a facial gesture.

4. The authentication technique for drone-user interaction of claim 1, wherein the authentication technique is mutual as the at least one drone and the at least one user exchange the at least one first embedding and the at least one second embedding with one another and independently compare the at least one first embedding with the at least one second embedding to reach a same authentication decision without relying on a cloud-based analytics system to perform the comparison.

5. The authentication technique of claim 1, wherein the at least one user does not provide biometric data prior to interaction with the at least one drone and wherein authentication is performed without comparing the at least one first embedding sequence or the at least one second embedding sequence to a pre-enrolled biometric template of the user.

6. The authentication technique of claim 1, wherein the at least one user and the at least one drone capture video in real time during a synchronized recording interval negotiated between the at least one user device and the at least one drone.

7. The authentication technique of claim 1, wherein multiple attempts at encoding at least one frame of the at least one drone video and at least one frame of the at least one user video to form at least one first embedding sequence and at least one second embedding sequence of at least one aspect of the user are conducted until a maximum number of attempts is reached by repeating video capture, encoding, and comparison for a new authentication session each time authentication fails.

8. The authentication technique of claim 1, wherein accuracy is defined as:

$$\text{Accuracy} = (TP + TN)/(TP + TN + FP + FN),$$

Wherein:

TP is the number of true positives,

TN is the number of true negatives,

FP is the number of false positives, and

FN is the number of false negatives.

9. An authentication method for device-user interaction comprising:

at least one device having a camera and configured to capture a device video of the user while the user simultaneously captures a user video on a smartphone;

at least one user with at least one smartphone that provides session ground truth for the user's live facial expression without requiring prior enrollment of the user's biometric information;

wherein the at least one device and the at least one smartphone take at least one device video and at least one user video of the user substantially simultaneously during a same authentication session;

encoding at least one frame of the at least one device video and at least one frame of the at least one user video to form at least one first embedding sequence and at least one second embedding sequence of at least one aspect of the user by encoding corresponding frames into timestamp-associated face embeddings arranged in temporal order;

comparing the at least one first embedding and the at least one second embedding to determine at least one distance value, authenticating the at least one device and the at least one user with one another based on correlation of the at least one distance value derived from the at least one device video and the at least one user video.

10. The authentication technique for device-user interaction of claim 9, wherein the at least one aspect of the at least one user is the at least one user's face.

11. The authentication technique for device-user interaction of claim 10, wherein the at least one device directs the at least one user to vary the at least one aspect of the at least one user's face by making a facial gesture.

12. The authentication technique for device-user interaction of claim 9, wherein the authentication technique is mutual as the at least one device and the at least one user exchange the at least one first embedding and the at least one second embedding with one another and independently compare the at least one first embedding with the at least one second embedding to reach a same authentication decision without relying on a cloud-based analytics system to perform the comparison.

13. The authentication technique of claim 9, wherein the at least one user does not provide biometric data prior to interaction with the at least one device and wherein authentication is performed without comparing the at least one first embedding sequence or the at least one second embedding sequence to a pre-enrolled biometric template of the user.

14. The authentication technique of claim 9, wherein the at least one user and the at least one device capture video in real time during a synchronized recording interval negotiated between the at least one device and the at least one smartphone.

15. The authentication technique of claim 9, wherein multiple attempts at encoding at least one frame of the at least one device video and at least one frame of the at least one user video to form at least one first embedding sequence and at least one second embedding sequence of at least one aspect of the user are conducted until a maximum number of attempts is reached by repeating device-video capture, user-video capture, encoding, and comparison for a new authentication session each time authentication fails.

16. The authentication technique of claim 9, wherein accuracy is defined as:

$$\text{Accuracy} = (TP + TN)/(TP + TN + FP + FN),$$

Wherein:

TP is the number of true positives,

TN is the number of true negatives,

FP is the number of false positives, and

FN is the number of false negatives.

17. The authentication technique for device-user interaction of claim 9, wherein the at one device comprises at least one vehicle, the vehicle having a camera configured to capture the at least one device video of the user during authentication.

* * * * *